(12) United States Patent
Mahdian et al.

(10) Patent No.: US 11,349,948 B2
(45) Date of Patent: May 31, 2022

(54) DISTRIBUTING CACHED CONTENT IN A NETWORK

(71) Applicant: Northeastern University, Boston, MA (US)

(72) Inventors: Milad Mahdian, New York, NY (US); Armin Moharrer, Chestnut Hill, MA (US); Efstratios Ioannidis, Boston, MA (US); Edmund Meng Yeh, Newton, MA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 17/050,152

(22) PCT Filed: May 7, 2019

(86) PCT No.: PCT/US2019/031064
§ 371 (c)(1),
(2) Date: Oct. 23, 2020

(87) PCT Pub. No.: WO2019/217380
PCT Pub. Date: Nov. 14, 2019

(65) Prior Publication Data
US 2021/0112135 A1    Apr. 15, 2021

Related U.S. Application Data

(60) Provisional application No. 62/668,617, filed on May 8, 2018.

(51) Int. Cl.
*H04L 67/5682* (2022.01)
*H04L 67/10* (2022.01)

(52) U.S. Cl.
CPC .......... *H04L 67/2852* (2013.01); *H04L 67/10* (2013.01)

(58) Field of Classification Search
CPC .. H04L 67/2852; H04L 67/10; H04L 67/2842
See application file for complete search history.

(56) References Cited

U.S. PATENT DOCUMENTS 5,875,464 A * 2/1999 Kirk ................... G06F 12/1054
711/129
9,065,809 B2   6/2015 Kling et al.
(Continued)

OTHER PUBLICATIONS

PCT International Search Report and Written Opinion for International Application No. PCT/US2019/031064, entitled "Distributing Cached Content in a Network," dated Jul. 22, 2019.
(Continued)

*Primary Examiner* — El Hadji M Sall
(74) *Attorney, Agent, or Firm* — Hamilton, Brook, Smith & Reynolds, P.C.

(57) ABSTRACT

The invention relates to a computer-implemented method, a corresponding a computer program product and a corresponding apparatus for distributing cached content in a network, the computer-implemented method comprising: collecting statistics regarding requests made and paths taken by the requests from source nodes to server nodes via intermediate nodes, the source nodes, intermediate nodes, and server nodes interconnected by edges having queues with respective queue sizes associated therewith, the requests including indications of content items to be retrieved; storing the content items at the server nodes; caching, by the intermediate nodes, the content items up to a caching capacity; and performing caching decisions that determine which of the content items are to be cached at which of the intermediate nodes, based upon costs that are monotonic, non-decreasing functions of the sizes of the queues.

20 Claims, 13 Drawing Sheets

(56) References Cited

U.S. PATENT DOCUMENTS

| | | | |
|---|---|---|---|
| 2003/0215006 A1* | 11/2003 | Raghothaman | H04B 7/0636 375/220 |
| 2009/0043729 A1* | 2/2009 | Liu | G06F 16/24542 |
| 2012/0072526 A1* | 3/2012 | Kling | G06F 12/0871 709/213 |

OTHER PUBLICATIONS

Ioannidis et al., "Adaptive Caching Networks with Optimality Guarantees," Measurement and Modeling of Computer Science, Jun. 14, 2016, pp. 113-124.

International Preliminary Report on Patentability for Int'l Application No. PCT/US2019/031064, titled: Distributing Cached Content in a Network, dated Nov. 10, 2020.

\* cited by examiner

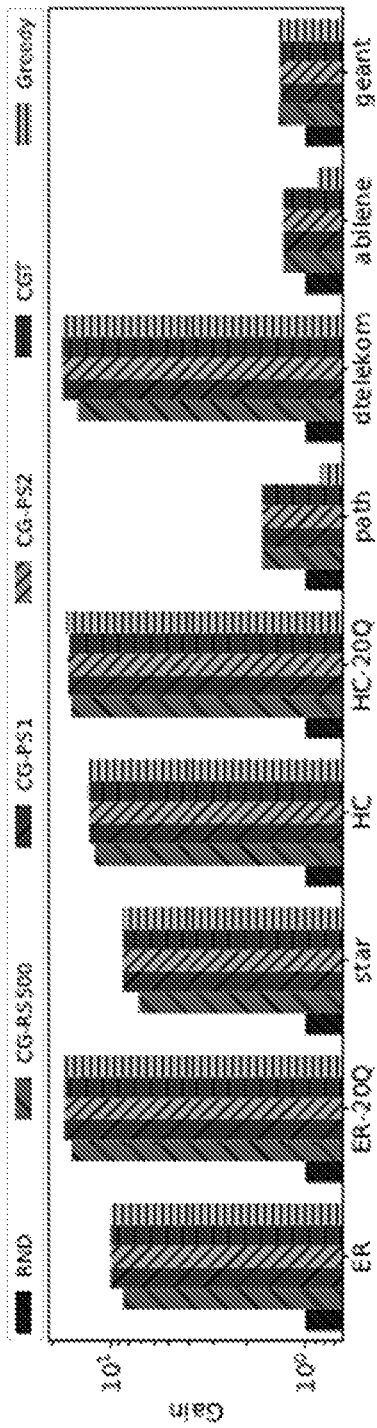
FIG. 4A Power-law demand
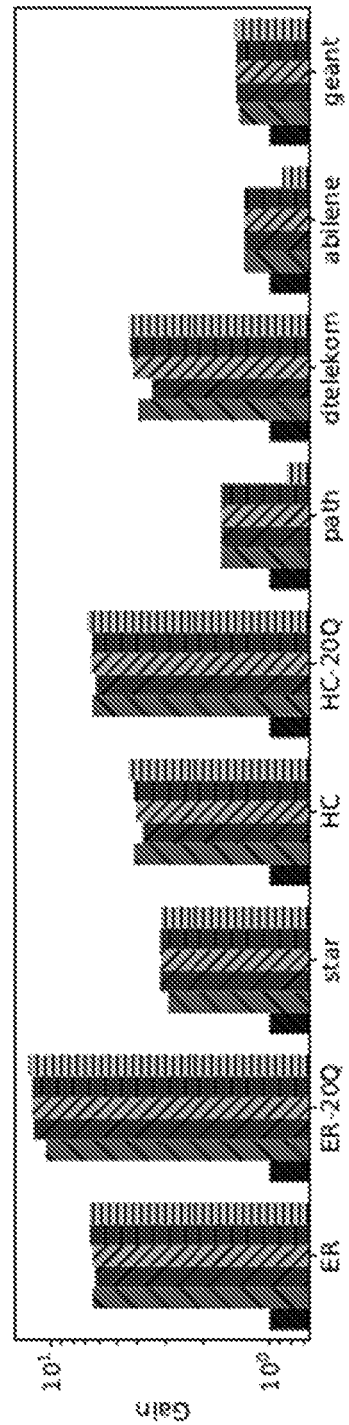
FIG. 4B Uniform demand

DISTRIBUTING CACHED CONTENT IN A NETWORK

RELATED APPLICATION

This application is the U.S. National Stage of International Application No. PCT/US2019/031064, filed May 7, 2019, which designates the U.S., published in English, and claims the benefit of U.S. Provisional Application No. 62/668,617, filed May 8, 2018. The entire teachings of the above applications are incorporated herein by reference.

GOVERNMENT SUPPORT

This invention was made with government support under Grant No. NeTS-1718355 from National Science Foundation. The government has certain rights in the invention.

BACKGROUND

Modern computer networks take advantage of routing, caching, and forwarding decisions in order to improve efficiency and packet throughput and latency. Improvements in these areas are needed.

SUMMARY

Embodiments of the present disclosure are directed to networks (including but not limited to content delivery networks), network nodes, computer methods, systems, and computer program products that operate in networks that route requests in a network and replicate and store content. According to some embodiments, caching and storage decisions, i.e., determining where content should be stored, are determined in a manner that considers link congestion between neighboring nodes and other parameters, such as delay, in the network. Through this method, embodiments of the present disclosure cache and store content in a more efficient manner than existing methods that do not consider caching parameters.

In some embodiments, a network manager is configured to collect statistics regarding requests made and paths taken by the requests from source nodes to server nodes via intermediate nodes. The source nodes, intermediate nodes, and server nodes are interconnected by edges having queues with respective queue sizes associated therewith. The requests may include indications of content items to be retrieved. The content items may be stored at the server nodes. The intermediate nodes may be configurable to cache the content items up to a caching capacity. The network manager may be configured to perform caching decisions that determine which of the content items are to be cached at which of the intermediate nodes based upon costs that are monotonic, non-decreasing functions of the sizes of the queues.

In some embodiments, the network manager may be configured to perform the caching decisions further based on a greedy computer-implemented method. In some embodiments, the costs may be associated with one or more of the edges.

In some embodiments, the costs may be determined based upon a Taylor approximation. In some embodiments, the costs may be expected costs.

In some embodiments, the network manager may be configured to perform the caching decisions further based on marginal gain. In some embodiments, the marginal gain may be associated with the costs with respect to the determination of which of the content items are to be cached.

Certain example embodiments described herein are in reference to a network manager embodiment, but pertain similarly to the computer methods, network nodes, networks, systems, and computer program products.

BRIEF DESCRIPTION OF THE DRAWINGS

The foregoing is apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 4A illustrates caching gain with power-law demand for various network topologies in which some embodiments may be configured to operate.

FIG. 4B illustrates caching gain with uniform demand for various network topologies in which some embodiments may be configured to operate.

DETAILED DESCRIPTION

Figure 1A:
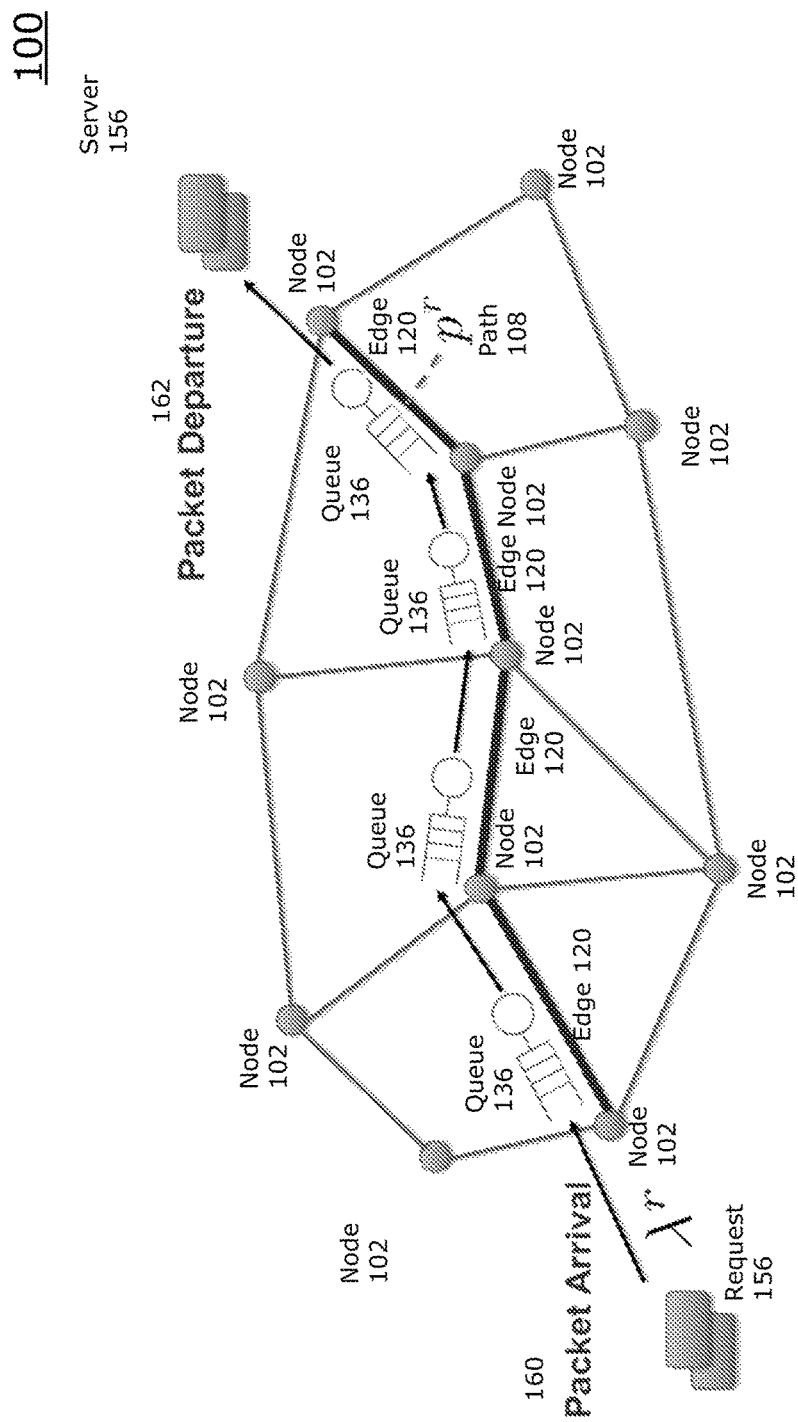
FIG. 1A is a high-level block diagram of forwarding at nodes of a network, according to some embodiments.

A description of example embodiments follows.

The teachings of all patents, published applications and references cited herein are incorporated by reference in their entirety.

Existing approaches to forwarding requests for content in a computer network have multiple problems. For example, existing approaches are not capable of handling caching of content in an efficient and effective manner. In existing approaches, the problem of caching is a non-deterministic polynomial time (NP)-hard problem, and therefore challenging to implement with efficient computational complexity.

Existing approaches of caching are very costly in terms of delay, queue size, queuing probability, and other queue size dependent costs.

Embodiments of the present disclosure solve the problems associated with existing approaches. Embodiments provide computer methods, systems, networks, network nodes, and computer program products for handling caching to deliver content. In stark contrast to existing approaches, embodiments reduce computational complexity and overcome the problem of NP-hard optimization, by applying greedy methods. In addition, embodiments of the present disclosure replicate and store contents in an arbitrary network topology to reduce costs that depend on traffic congestion is provided herein. Such costs include, but are not limited to, delay, queue size, queuing probability, and other queue size dependent costs.

Embodiments of the present disclosure have multiple advantages compared with existing approaches. As such, according to some embodiments, the computer methods, systems, networks, network nodes, and computer program products make caching decisions. An embodiment of a method makes caching decisions for arbitrary network topologies and storage constraints. An embodiment of the method determines caching decisions taking into account congestion via arbitrary convex cost functions, in contrast to existing approaches art that may operates under linear costs.

According to some embodiments, additional advantages include but are not limited to the following. An embodiment of the method makes caching decisions to reduce traffic dependent costs at network queues. In contrast to existing approaches, an embodiment of the method has provable optimality guarantees, attaining a cost reduction within a factor of approximately 0.67 from the optimal cost reduction attained by existing methods. An embodiment of the method avoids randomization and sampling, attaining provable guarantees at a reduced computational complexity. An embodiment of the method approximates arbitrary convex cost functions via power and Taylor series approximations, leading to a fast and efficient implementation avoiding randomization and sampling. An embodiment of the method significantly outperforms existing approaches in both caching decisions and computational complexity.

It should be understood that descriptions with respect to one embodiment, e.g., a method, may equally apply to alternative embodiments, e.g., a network, network node, computer program product, or system.

Embodiments may be implemented in a system where content is to be placed (i.e., content distribution) in a network with varying demand. Some such networks may include by are not limited to content delivery networks, information centric networks, peer-to-peer networks, or cloud computing.

FIG. 1A is a high-level block diagram of forwarding at nodes of a network 100, according to some embodiments. As illustrated in FIG. 1A, one or more requests (or packets, or packet requests) 156 may arrive 160 in the network and pass through a series of nodes 102 along a path 108 through the network 100 to a point of packet departure 162. The request may pass through one or more queues 136 along each edge 120 of the path 108.

Figure 1B:
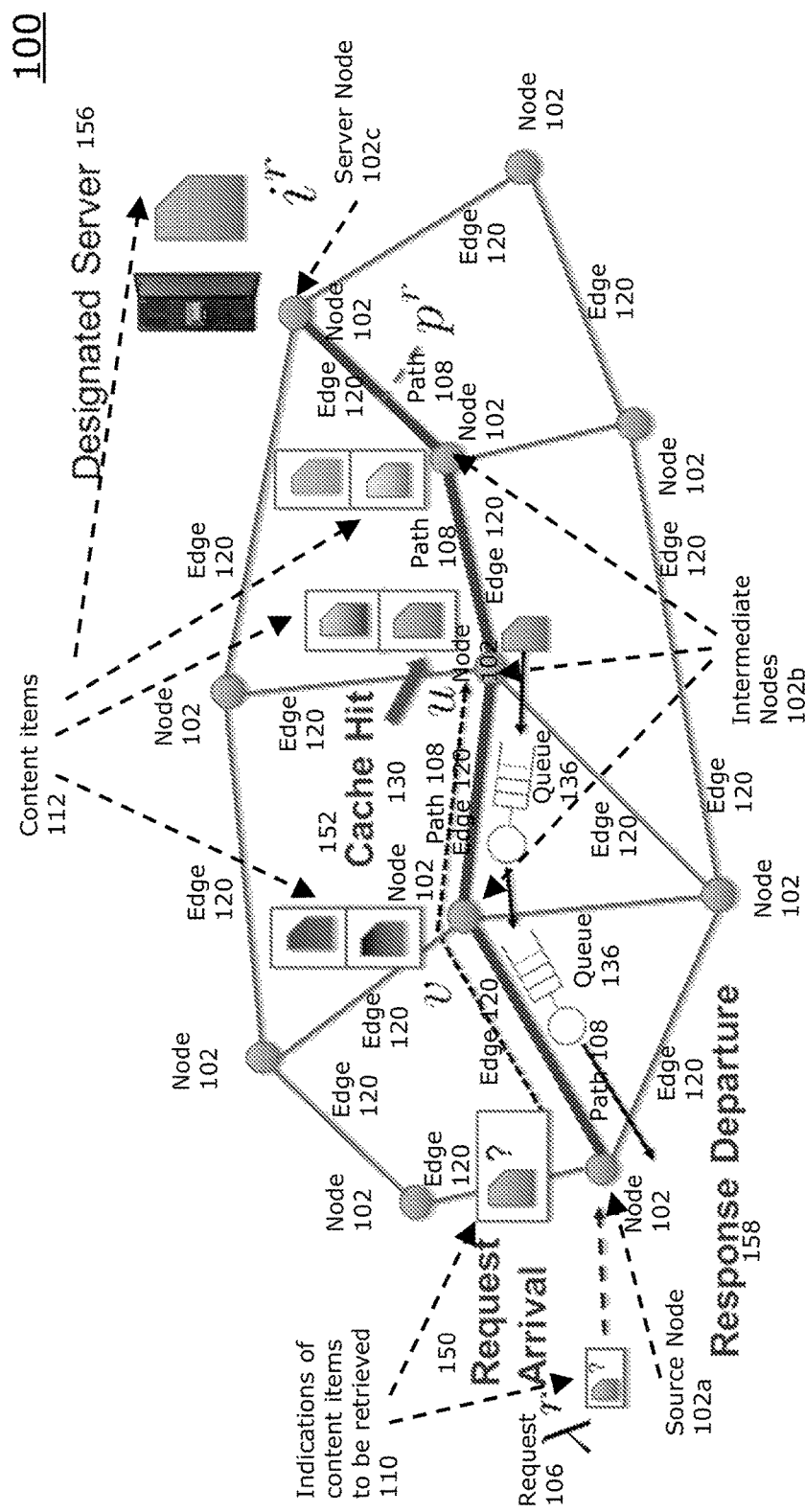
FIG. 1B is a high-level block diagram of forwarding and caching at nodes of a network, according to some embodiments.

FIG. 1B is a high-level block diagram of forwarding and caching at nodes of a network, according to some embodiments. As illustrated in FIG. 1B, one or more requests 106 may arrive 150 in the network (or network manager, or system) 100 and content items 112 may be depart 158 the network 100 are being retrieved by a cache hit 152.

As further illustrated in FIG. 1B, the network (or network manager, or system) 100 may be configured to collect statistics regarding requests 106 made and paths 108 taken by the requests 106 from source nodes 102a to server nodes 102c via intermediate nodes 102b. The server nodes 102 may be associated with one or more servers 150. The source nodes 102a, intermediate nodes 102b, and server nodes 102c may be interconnected by edges 120 having queues 136 with respective queue sizes associated therewith. The requests 106 may include indications 110 of content items 112 to be retrieved. The content items 112 may be stored at the server nodes. The intermediate nodes 102b may be configurable to cache the content items 112 up to a caching capacity. The network manager may be configured to perform caching decisions that determine which of the content items 112 are to be cached at which of the intermediate nodes 120b, based upon costs that are monotonic, non-decreasing functions of the sizes of the queues 136.

Some embodiments include queues, including but not limited to M/M/1 queues or any other queues known to one skilled in the art, in which nodes act as caches that store objects. As known to one skilled in the art, an M/M/k queue represents queue length in a system having a number of servers k (one server for an M/M/1 queue), where arrivals may be determined by Poisson process and service times may have an exponential distribution.

Exogenous requests for objects may be routed towards nodes that store them; as a result, object traffic in the network is determined may not only by demand but, also, by where objects are cached. Embodiments determine how to place objects in caches to attain a certain design objective, such as, e.g., minimizing network congestion or retrieval delays. Embodiments show that for a broad class of objectives, including minimizing both the expected network delay and the sum of network queue lengths, this optimization problem can be cast as an NP-hard submodular maximization problem. Embodiments show that a continuous greedy method [1] may attain a ratio close to $1-1/e \approx 0.63$ using a deterministic estimation via a power series, which may drastically reduce execution time compared with existing approaches that rely on sampling. Embodiments generalize, beyond M/M/1 queues, to networks of M/M/k and symmetric M/D/1 queues.

1 INTRODUCTION

According to some embodiments, Kelly networks [2] include multi-class networks of queues capturing a broad array of queue service disciplines, including FIFO, LIFO, and processor sharing. Both Kelly networks and their generalizations (including networks of quasi-reversible and symmetric queues) are well studied and classic topics [2], [3], [4], [5]. One of their most appealing properties is that their steady-state distributions have a product-form: as a result, steady state properties such as expected queue sizes, packet delays, and server occupancy rates have closed-form formulas as functions of, e.g., routing and scheduling policies.

Some embodiments include Kelly networks, in which nodes are equipped with caches, i.e., storage devices of finite capacity, which can be used to store objects. In some embodiments, Exogenous requests for objects may be routed towards nodes that store them; upon reaching a node that stores the requested object, a response packet containing the object is routed towards the request source. As a result, embodiments determine object traffic in the network not only by the demand but, also, by where objects are cached.

Some embodiments may include one or more networking applications involving the placement and transmission of content. As such, some embodiments include information centric networks [6], [7], [8], content delivery networks [9], [10], web-caches [11], [12], [13], wireless/femtocell networks [14], [15], [16], and peer-to-peer networks [17], [18].

According to some embodiments, determining the object placement, i.e., how to place objects in network caches, is a decision that can be made by the network designer in response to object popularity and demand. To that end, embodiments may determine how to place objects in caches so that traffic attains a design objective such as minimizing delay.

Embodiments provide various contributions.

First, embodiments solve the problem of optimizing the placement of objects in caches in Kelly cache networks of M/M/1 queues, with the objective of minimizing a cost function of the system state. Embodiments illustrate that, for a broad class of cost functions, including packet delay, system size, and server occupancy rate, this optimization may amount to a submodular maximization problem with matroid constraints. This result applies to general Kelly networks with fixed service rates; in particular, it holds for FIFO, LIFO, and processor sharing disciplines at each queue.

According to some embodiments, the continuous greedy method [1] may attain a 1−1/e approximation for this NP-hard problem. However, it does so by computing an expectation over a random variable with exponential support via randomized sampling. The number of samples required to attain the 1−1/e approximation guarantee can be prohibitively large in realistic settings.

Second, according to some embodiments, for Kelly networks of M/M/1 queues, this randomization can be entirely avoided: a closed-form solution may be computed using the Taylor expansion of the problem objective herein. Unlike some embodiments, existing approaches fail to identify a submodular maximization problem that exhibits this structure, and to exploit it to eschew sampling.

In addition, some embodiments extend results to networks of M/M/k and symmetric M/D/1 queues, prove a negative result: submodularity does not arise in networks of M/M/1/k queues. Embodiments include method that are extensively evaluated over several synthetic and real-life topologies.

Embodiments include and are described herein with respect to related work (Section 2 herein), a mathematical model of a Kelly cache network (Section 3 herein), and results on submodularity and the continuous-greedy method in networks of M/M/1 queues (in Sections 4 and 5 herein, respectively). Embodiments include extensions that are described herein (Section 6 herein), numerical evaluation (Section 7 herein).

2 RELATED WORK

Our approach is closest to, and inspired by, recent work by Shanmugam et al. [19] and Ioannidis and Yeh [8]. Ioannidis and Yeh consider a setting very similar to ours but without queuing: edges are assigned a fixed weight, and the objective is a linear function of incoming traffic scaled by these weights. According to some embodiments, one where edge costs are linear (see also Section 3.2). Shanmugam et al. [19] study a similar optimization problem, restricted to the context of femtocaching. The authors show that this is an NP-hard, submodular maximization problem with matroid constraints. They provide a 1−1/e approximation method based on a technique by Ageev and Sviridenko [20]: this involves maximizing a concave relaxation of the original objective, and rounding via pipage-rounding [20]. Ioannidis and Yeh show that the same approximation technique applies to more general cache networks with linear edge costs. They also provide a distributed, adaptive method that attains an 1−1/e approximation. The same authors extend this framework to jointly optimize both caching and routing decisions [21].

Some embodiments can be seen as an extension of [8], [19], in that they incorporate queuing in the cache network. In contrast to both [8] and [19] however, costs like delay or queue sizes are highly non-linear in the presence of queuing. From a technical standpoint, this departure from linearity enables embodiments herein to employ significantly different optimization methods than the ones in [8], [19]. Some embodiments do not admit a concave relaxation and, consequently, the technique by Ageev and Sviridenko [20] used in [8], [19] does not apply. Instead, embodiments solve a non-convex optimization problem directly (c.f. Eq. (13)) using the so-called continuous-greedy method.

Existing approaches solve cache optimization problems under restricted topologies [9], [22], [23], [24], [25]. These works model the network as a bipartite graph: nodes generating requests connect directly to caches in a single hop. Unlike embodiments, the existing approaches do not readily generalize to arbitrary topologies. In general, the approximation technique of Ageev and Sviridenko [20] applies to this bipartite setting, and additional approximation methods are devised for several variants [9], [22], [23], [24]. Embodiments improve by (a) considering a multi-hop setting, and (b) introducing queuing, which none of the above works considers.

Submodular function maximization subject to matroid constraints appears in many important problems in combinatorial optimization; for a brief review of the topic and applications, see [26] and [27], respectively. Nemhauser et al. [28] show that the greedy method produces a solution within ½ of the optimal. Vondrák [29] and Calinescu et al. [1] show that the continuous-greedy method produces a solution within (1−1/e) of the optimal in polynomial time, which cannot be further improved [30]. In the general case, the continuous-greedy method requires sampling to estimate the gradient of the so-called multilinear relaxation of the objective (see Section 5). According to some embodiments, MAXCG, the optimization problem studied herein, exhibits additional structure: Embodiments use this to construct a sampling-free estimator of the gradient via a power-series or Taylor expansion. Some embodiments use such an expansion to eschew sampling; this technique may apply to submodular maximization problems beyond MAXCG.

3 MODEL

Motivated by applications such as ICNs [6], CDNs [9], [10], and peer-to-peer networks [17], some embodiments include Kelly cache networks. In contrast to classic Kelly networks, each node is associated with a cache of finite storage capacity. Exogenous traffic consisting of requests is routed towards nodes that store objects; upon reaching a node that stores the requested object, a response packet containing the object is routed towards the node that generated the request. As a result, content traffic in the network is determined not only by demand but, crucially, by how contents are cached. Appendix A.1 includes classic Kelly networks. An illustration highlighting the differences between Kelly cache networks, introduced below, and classic Kelly networks, can be found in FIG. 1A.

Some embodiments describe Kelly cache networks in terms of FIFO M/M/1 queues, the product form distribution (c.f. (4)) arises for many different service principles beyond FIFO (c.f. Section 3.1 of [2]) including Last-In First-Out (LIFO) and processor sharing. All results included herein extend to these service disciplines; more extensions are included in Section 6.

3.1 Kelly Cache Networks

Graphs and Paths. We use the notation G (V, E) for a directed graph G with nodes V and edges E⊆V×V. A directed graph is called symmetric or bidirectional if (u, v)∈E if and only if (v, u)∈E. A path p is a sequence of adjacent nodes, i.e., p=p$_1$, p$_2$, . . . , p$_K$ where (p$_k$, p$_{k+1}$)∈E, for all 1≤i<K≡|p|. A path is simple if it contains no loops (i.e., each node appears once). We use the notation v∈p, where v∈V, to indicate that node v appears in the path, and e∈p, where e=(u, v)∈E, to indicate that nodes u,v are two consecutive (and, therefore, adjacent) nodes in p. For v∈p, where p is simple, embodiments denote by k$_p$(v)∈{1, . . . , |p|} the position of node v∈V in p, i.e., k$_p$(v)=k if p$_k$=v.

Network Definition. Some embodiments include a Kelly network of M/M/1 FIFO queues, represented by a symmetric directed graph G (V, E). As in classic Kelly networks, each edge e∈E is associated with an M/M/1 queue with service rate $\mu_e$. We associate queues with edges for concreteness. Alternatively, queues can be associated with nodes, or both nodes and edges; all such representations lead to product form distributions (4), and results herein extend to these cases. In addition, each node has a cache that stores objects of equal size from a set $\mathcal{C}$, the object catalog. Each node v∈V may store at most c$_v$∈ℕ objects from $\mathcal{C}$ in its cache. Hence, if x$_{vi}$∈{0,1} is a binary variable indicating whether node v∈V is storing object i∈$\mathcal{C}$, then $\Sigma_{i\in\mathcal{C}}$ x$_{vi}$≤c$_v$, for all v∈V. Some embodiments include x=[x$_{vi}$]$_{v\in V, i\in \mathcal{C}}$∈{0,1}$^{|V||\mathcal{C}|}$ as the global placement or, simply, placement vector. We denote by $$\mathcal{D} = \{x \in \{0,1\}^{|V||\mathcal{C}|} : \Sigma_{i\in\mathcal{C}} x_{vi} \leq c_v, \forall v \in V\}, \quad (1)$$

the set of feasible placements that satisfy the storage capacity constraints. Some embodiments assume that for every object i∈$\mathcal{C}$, there exists a set of nodes $\mathcal{S}_i$⊆V that permanently store i. Some embodiments include nodes in $\mathcal{S}_i$ as designated servers for i∈$\mathcal{C}$. Some embodiments assume that designated servers store i in permanent storage outside their cache. Put differently, the aggregate storage capacity of a node is c'$_v$=c$_v$+|{i:v∈$\mathcal{S}_i$}|, but only the non-designated slots c$_v$ are part of the system's design.

Object Requests and Responses. Traffic in the cache network consists of two types of packets: requests and responses, as shown in FIG. 1B. Requests for an object are always routed towards one of its designated servers, ensuring that every request is satisfied. However, requests may terminate early: upon reaching any node that caches the requested object, the latter generates a response carrying the object. This is forwarded towards the request's source, following the same path as the request, in reverse. Consistent with prior literature [8], [21], embodiments treat request traffic as negligible when compared to response traffic, which carries objects, and henceforth focus only on queues bearing response traffic.

Formally, a request and its corresponding response are fully characterized by (a) the object being requested, and (b) the path that the request follows. That is, for the set of requests $\mathcal{R}$, a request r∈$\mathcal{R}$ is determined by a pair (i$^r$, p$^r$), where i$^r$∈$\mathcal{C}$ is the object being requested and p$^r$ is the path the request follows. Each request r is associated with a corresponding Poisson arrival process with rate $\lambda^r$≥0, independent of other arrivals and service times. We denote the vector of arrival rates by $\lambda$=[$\lambda^r$]$_{r\in\mathcal{R}}$∈ℝ$_+^{|\mathcal{R}|}$. For all r∈$\mathcal{R}$, Some embodiments assume that the path p$^r$ is well-routed [8], that is: (a) path p$^r$ is simple, (b) the terminal node of the path is a designated server, i.e., a node in $\mathcal{S}_{i^r}$, and (c) no other intermediate node in p$^r$ is a designated server. As a result, requests are always served, and response packets (carrying objects) always follow a sub-path of p$^r$ in reverse towards the request source (namely, p$_1^r$).

Steady State Distribution. Given an object placement x∈$\mathcal{D}$, the resulting system is a multi-class Kelly network, with packet classes determined by the request set $\mathcal{R}$. This is a Markov process over the state space determined by queue contents. In particular, let n$_e^r$ be the number of packets of class r∈$\mathcal{R}$ in queue e∈E, and n$_e$=$\Sigma_{r\in\mathcal{R}}$ n$_e^r$ be the total queue size. The state of a queue n$_e$∈$\mathcal{R}^{n_e}$, e∈E, is the vector of length n$_e$ representing the class of each packet in each position of the queue. The system state is then given by n=[n$_e$]$_{e\in E}$; embodiments denote by Ω the state space of this Markov process.

In contrast to classic Kelly networks, network traffic and, in particular, the load on each queue, depend on placement x. Indeed, if (v, u)∈p$^r$ for r∈$\mathcal{R}$, the arrival rate of responses of class r∈$\mathcal{R}$ in queue (u, v)∈E is:

$$\lambda_{(u,v)}^r(x,\lambda) = \lambda^r \prod_{k'=1}^{k_{p^r}(v)} (1 - x_{p_{k'}^r, i^r}), \text{ for } (v,u) \in p^r, \quad (2)$$

i.e., responses to requests of class r pass through edge (u, v)∈E if and only if no node preceding u in the path p$^r$ stores object i$^r$—see also FIG. 1B. As $\mu_{(u,v)}$ is the service rate of the queue in (u, v)∈E, the load on edge (u, v)∈E is:

$$\rho_{(u,v)}(x,\lambda) = \frac{1}{\mu_{(u,v)}} \Sigma_{r\in\mathcal{R}:(v,u)\in p^r} \lambda_{(u,v)}^r(x,\lambda). \quad (3)$$

The Markov process {n(t); t≥0}$_{t≥0}$ is positive recurrent when $\rho_{(u,v)}$(x,$\lambda$)<1, for all (u, v)∈E [2], [31]. Then, the steady-state distribution has a product form, i.e.:

$$\pi(n) = \prod_{e\in E} \pi_e(n_e), \, n \in \Omega, \quad (4)$$

where $\pi_e(n_e) = (1 - \rho_e(x,\lambda)) \prod_{r\in\mathcal{R}: e\in p^r} \left(\frac{\lambda_e^r(x,\lambda)}{\mu_e}\right)^{n_e^r}$, and $\lambda_e^r$(x, $\lambda$), $\pi_e$(x, $\lambda$) are given by (2), (3), respectively.

Stability Region. Given a placement x∈$\mathcal{D}$, a vector of arrival rates $\lambda$=[$\lambda^r$]$_{r\in\mathcal{R}}$ yields a stable (i.e., positive recurrent) system if and only if $\lambda$∈$\Lambda_x$, where $$\nabla_x := \{\lambda: \lambda \geq 0, \rho_e(x,\lambda)<1, \forall e \in E\} \subset \mathbb{R}_+^{|\mathcal{R}|}, \quad (5)$$

where loads $\rho_e$, e∈E, are given by (3). Conversely, given a vector $\lambda$∈ℝ$_+^{|\mathcal{R}|}$, $$\mathcal{D}_\lambda = \{x \in \mathcal{D} : \rho_e(x,\lambda)<1, \forall e \in E\} \subseteq \mathcal{D} \quad (6)$$

is the set of feasible placements under which the system is stable. It is easy to confirm that, by the monotonicity of $\rho_e$ w.r.t. x, if x∈$\mathcal{D}_\lambda$ and x'≥X, then x'∈$\mathcal{D}_\lambda$, where the vector inequality x'≥x is component-wise. In particular, if 0∈D$_\lambda$ (i.e., the system is stable without caching), then $\mathcal{D}_\lambda$=$\mathcal{D}$.

3.2 Cache Optimization

Given a Kelly cache network represented by graph G(V, E), service rates $\mu_e$, e∈E, storage capacities $c_v$, v∈V, a set of requests $\mathcal{R}$, and arrival rates $\lambda_r$, for r∈$\mathcal{R}$, embodiments determine placements x∈$\mathcal{D}$ that optimize a certain design objective. Some embodiments determine placements that are solutions to optimization problems of the following form:

$$\text{Minimize: } \overset{MINCOST}{C(x)} = \Sigma_{e \in E} C_e(\rho_e(x, \lambda)), \quad (7a)$$

$$\text{subj. to: } x \in D_\lambda, \quad (7b)$$

where $C_e: [0,1) \to \mathbb{R}_+$, e∈E, are positive cost functions, $\rho_e: \mathcal{D} \times \mathbb{R}_+^{|\mathcal{R}|} \to \mathbb{R}_+$ is the load on edge e, given by (3), and $\mathcal{D}_\lambda$ is the set of feasible placements that ensure stability, given by (6). We make the following standing assumption on the cost functions appearing in MINCOST:

Assumption 1. For all e∈E, functions $C_e: [0,1) \to \mathbb{R}_+$ are convex and non-decreasing on [0,1).

Assumption 1 is natural; it holds for many cost functions that often arise in practice. Embodiments include several examples:

Example 1. Queue Size: Under steady-state distribution (4), the expected number of packets in queue e∈E is given by $$\mathbb{E}[n_e] = C_e(\rho_e) = \frac{\rho_e}{1-\rho_e},$$

which is convex and non-decreasing for $\rho_e \in [0,1)$. Hence, the expected total number of packets in the system in steady state can be written as the sum of such functions.

Example 2. Delay: From Little's Theorem [31], the expected delay experienced by a packet in the system is $$\mathbb{E}[T] = \frac{1}{\|\lambda\|_1} \Sigma_{e \in E} \mathbb{E}[n_e],$$

where $\|\lambda\|_1 = [\lambda^r]_{r \in \mathcal{R}} \lambda^r$ is the total arrival rate, and $\mathbb{E}[n_e]$ is the expected size of each queue. Thus, the expected delay can also be written as the sum of functions that satisfy Assumption 1. According to some embodiments, the same is true for the sum of the expected delays per queue e∈E, as the latter are given by $$\mathbb{E}[T_e] = \frac{1}{\lambda_e} \mathbb{E}[n_e] = \frac{1}{\mu_e(1-\rho_e)},$$

which are also convex and non-decreasing in $\rho_e$.

Example 3. Queuing Probability/Load per Edge: In a FIFO queue, the queuing probability is the probability of arriving in a system where the server is busy; this is given by $C_e(\rho_e) = \rho_e = \lambda_e/\mu_e$, which is again non-decreasing and convex. This is also, of course, the load per edge. By treating $1/\mu_e$ as the weight of edge e∈E, this setting recovers the objective of [8] as a special case of some embodiments.

Example 4. Monotone Separable Costs: More generally, Assumption 1 holds for arbitrary monotone separable costs, i.e., functions that are (1) separable across queues, (2) depend only on queue sizes $n_e$, and (3) are non-decreasing.

Formally:

Lemma 1. Consider a state-dependent cost function c: $\Omega \to \mathbb{R}_+$ such that:

$$c(n) = \sum_{e \in E} c_e(n_e),$$

where $c_e: \mathbb{N} \to \mathbb{R}_+$, e∈E, are non-decreasing functions of the queue sizes $n_e$, e∈E. Then, the steady state cost under distribution (4) has precisely form (7a) with convex costs, i.e., $$\mathbb{E}[c(n)] = \sum_{e \in E} C_e(\rho_e)$$

where $C_e: [0,1) \to \mathbb{R}_+$ satisfy Assumption 1.

Proof. As the cost at state n∈Ω can be written as $c(n) = \Sigma_{e \in E} c_e(n_e)$, embodiments may include that $\mathbb{E}[c(n)] = \Sigma_{e \in E} \mathbb{E}[c_e(n_e)]$. On the other hand, as $c_e(n_e) \geq 0$, $$\mathbb{E}[c_e(n_e)] = \sum_{n=0}^{\infty} c_e(n) P(n_e = n) \quad (8)$$

$$= c_e(0) + \sum_{n=0}^{\infty} (c_e(n+1) - c_e(n)) P(n_e > n)$$

$$\overset{(23)}{=} c_e(0) + \sum_{n=0}^{\infty} (c_e(n+1) - c_e(n)) \rho_e^n$$

As $c_e$ is non-decreasing, $c_e(n+1) - c_e(n) \geq 0$ for all n∈$\mathbb{N}$. On the other hand, for all n∈$\mathbb{N}$, $\rho^n$ is a convex non-decreasing function of $\rho$ in [0,1), so $\mathbb{E}[c_e(n_e)]$ is a convex function of $\rho$ as a positively weighted sum of convex non-decreasing functions.

In summary, MINCOST captures many natural cost objectives, while Assumption 1 holds for any monotonically increasing cost function that depends only on queue sizes.

TABLE 1

Notation Summary

| | |
|---|---|
| Kelly Cache Networks | |
| G(V, E) | Network graph, with nodes V and edges E |
| $k_p(v)$ | position of node v in path p |
| μ(u,v) | Service rate of edge (u,v) ∈ E |
| $\mathcal{R}$ | Set of classes/types of requests |
| $\lambda^r$ | Arrival rate of class r ∈ $\mathcal{R}$ |
| $p^r$ | Path followed by class r ∈ $\mathcal{R}$ |
| $i^r$ | Object requested by class r ∈ $\mathcal{R}$ |
| $\mathcal{C}$ | Item catalog |
| $\mathcal{S}_i$ | Set of designated servers of i ∈ $\mathcal{C}$ |
| $c_v$ | Cache capacity at node v ∈ V |
| $x_{vi}$ | Variable indicating whether v ∈ V stores i ∈ $\mathcal{C}$ |
| x | Placement vector of $x_{v,i}$s, in $\{0,1\}^{|\mathcal{V}||\mathcal{C}|}$ |
| λ | Vector of arrival rates $\lambda^r$, r ∈ $\mathcal{R}$ |
| $\lambda_e^r$ | Arrival rate of class r responses over edge e ∈ E |
| $\rho_e$ | Load on edge e ∈ E |
| Ω | State space |
| n | Global state vector in Ω |

TABLE 1-continued

Notation Summary

| | |
|---|---|
| $\pi(n)$ | Steady-state distribution of $n \in \Omega$ |
| $n_e$ | State vector of queue at edge $e \in E$ |
| $\pi_e(n_e)$ | Marginal of steady-state distribution of queue $n_e$ |
| $n_e$ | Size of queue at edge $e \in E$ |
| | Cache Optimization |
| $\mathcal{C}$ | Global Cost function |
| $\mathcal{C}_e$ | Cost function of edge $e \in E$ |
| $\mathcal{D}$ | Set of placements x satisfying capacity constraints |
| $x_0$ | A feasible placement in $\mathcal{D}$ |
| $F(x)$ | Caching gain of placement x over $x_0$ |
| $y_{vi}$ | Probability that $v \in V$ stores $i \in \mathcal{C}$ |
| $y$ | Vector of marginal probabilities $y_{vi}$, in $\{0, 1\}^{|V||\mathcal{C}|}$ |
| $G(y)$ | Multilinear extension under marginals y |
| $\mathcal{D}_\lambda$ | Set of placements under which system is stable under arrivals $\lambda$ |
| $\hat{\mathcal{D}}$ | Convex hull of constraints of MAXCG |
| | Conventions |
| supp(.) | Support of a vector |
| conv(.) | Convex hull of a set |
| [x] + 1 | Vector equal to x with i-th coordinate set to 1 |
| [x] − 1 | Vector equal to x with i-th coordinate set to 0 |
| 0 | Vector of zeros |

4 SUBMODULARITY AND THE GREEDY METHOD

According to some embodiments, the problem of MIN-COST is NP-hard; this is true even when cost functions $c_e$ are linear, and the objective is to minimize the sum of the loads per edge [8], [19]. Embodiments solve this problem. Embodiments include the objective of MINCOST as a supermodular set function. Embodiments contribute by showing that this property is a direct consequence of Assumption 1.

Cost Supermodularity and Caching Gain. Some embodiments observe that the cost function C in MINCOST can be naturally expressed as a set function. According to some embodiments, for $S \subset V \times \mathcal{C}$, let $x_S \in \{0,1\}^{|V||\mathcal{C}|}$ be the binary vector whose support is S (i.e., its non-zero elements are indexed by S). As there is a 1-1 correspondence between a binary vector x and its support supp(x), embodiments interpret C: $\{0,1\}^{|V||\mathcal{C}|} \to \mathbb{R}_+$ as set function C: $V \times \mathcal{C} :\to \mathbb{R}_+$ via $C(S) \triangleq C(x_S)$. Then, the following theorem holds:

Theorem 1. Under Assumption 1, $C(S) \triangleq C(x_S)$ is non-increasing and supermodular over $\{\text{supp}(x): x \in \mathcal{D}_\lambda\}$.

Proof. Some embodiments prove the following auxiliary lemma:

Lemma 2. Let f: $\mathbb{R} \to \mathbb{R}$ be a convex and non-decreasing function. Also, let g: $\chi \to \mathbb{R}$ be a non-increasing supermodular set function. Then $h(x) \triangleq f(g(x))$ is also supermodular.

Proof. Since g is non-increasing, for any x, $x' \subseteq \chi$ embodiments may include $$g(x \cap x') \geq g(x) \geq g(x \cup x'),$$

$$g(x \cap x') \geq g(x') \geq g(x \cup x'),$$

Due to supermodularity of g, embodiments can find $\alpha$, $\alpha' \in [0,1]$, $\alpha + \alpha' \leq 1$ such that $$g(x) = (1-\alpha)g(x \cap x') + \alpha g(x \cup x'),$$

$$g(x') = (1-\alpha')g(x \cap x') + \alpha' g(x \cup x').$$

Then, some embodiments have $$f(g(x)) + f(g(x'))$$

$$\leq (1-\alpha)f(g(x \cap x')) + \alpha f(g(x \cup x'))$$

$$+ (1-\alpha')f(g(x \cap x')) + \alpha' f(g(x \cup x'))$$

$$= f(g(x \cap x')) + f(g(x \cup x'))$$

$$+ (1-\alpha-\alpha')(f(g(x \cap x')) - f(g(x \cup x')))$$

$$\leq f(g(x \cap x')) + f(g(x \cup x')),$$

where the first inequality is due to convexity of f, and the second one is because $\alpha + \alpha' \leq 1$ and $f(g(\bullet))$ is non-increasing. This proves $h(x) \triangleq f(g(x))$ is supermodular.

To conclude the proof of Thm. 1, observe that it is easy to verify that $\rho_e$, $\forall e \in E$, is supermodular and non-increasing in S (see also [8]). Since, by Assumption 1, $C_e$ is a non-decreasing function, then, $C_e(S) \triangleq C_e(\rho_{u,v}(S))$ is non-increasing. By Lemma 2, $C_S(S)$ is also supermodular. Hence, the cost function is non-increasing and supermodular as the sum of non-increasing and supermodular functions.

In light of the observations in Section 3.2 regarding Assumption 1, Thm. 1 implies that supermodularity arises for a broad array of natural cost objectives, including expected delay and system size; it also applies under the full generality of Kelly networks, including FIFO, LIFO, and round robin service disciplines. Armed with this theorem, some embodiments convert MINCOST to a submodular maximization problem. In doing so, some embodiments solve the problem that domain $\mathcal{D}_\lambda$, determined not only by storage capacity constraints, but also by stability, may be difficult to characterize. Nevertheless, embodiments illustrate that a problem that is amenable to approximation can be constructed, provided that a placement $x_0 \in \mathcal{D}_\lambda$ is known.

In particular, suppose that embodiments include access to a single $x_0 \in \mathcal{D}_\lambda$. We define the caching gain F: $\mathcal{D}_\lambda \to \mathbb{R}_+$ as $F(x) = C(x_0) - C(x)$. Note that, for $x \geq x_0$, $F(x)$ is the relative decrease in the cost compared to the cost under $x_0$. We consider the following optimization problem:

$$\underset{\text{MAXCG}}{\text{Maximize}} F(x) = C(x_0) - C(x) \quad (9a)$$

$$\text{subj. to: } x \in \mathcal{D}, x \geq x_0 \quad (9b)$$

Some embodiments observe that, if $0 \in \mathcal{D}_\lambda$, then $\mathcal{D}_\lambda = \mathcal{D}$; in this case, taking $x_0 = 0$ ensures that problems MINCOST and MAXCG are equivalent. If $x_0 \neq 0$, the above formulation attempts to maximize the gain restricted to placements $x \in \mathcal{D}$ that dominate $x_0$: such placements necessarily satisfy $x \in \mathcal{D}_\lambda$. Thm. 1 has the following immediate implication:

Corollary 1. The caching gain $F(S) \triangleq F(x_S)$ is non-decreasing and submodular over $\{\text{supp}(x): x \in \mathcal{D}_\lambda\}$.

Greedy Method. Constraints (9b) define a (partition) matroid [1], [19]. This, along with the submodularity and monotonicity of F illustrate that embodiments may produce a solution within ½-approximation from the optimal via the greedy method [32]. The method, summarized in Method 1, iteratively allocates items to caches that yield the largest marginal gain. The solution produced by Method 1 is guaranteed to be within a ½-approximation ratio of the optimal solution of MAXCG [28]. The approximation guarantee of ½ is tight:

Lemma 3. For any $\varepsilon>0$, there exists a cache network the greedy method solution is within $1/2+\varepsilon$ from the optimal, when the objective is the sum of expected delays per edge.

Proof. Consider the path topology illustrated in FIG. 2. Assume that requests for files 1 and 2 are generated at node u with rates $\lambda_1=\lambda_2=\delta$, for some $\delta\in(0,1)$. Files 1 and 2 are stored permanently at v and z, respectively. Caches exist only on u and w, and have capacity $c_u=c_w=1$. Edges (u, v), (w, z) have bandwidth $\mu_{(u,v)}=\mu_{(w,z)}=1$, while edge (u, w) is a high bandwidth link, having capacity $M\gg1$. Let $x_0=0$. The greedy method starts from empty caches and adds item 2 at cache u. This is because the caching gain from this placement is $$c_{(u,w)} + c_{(w,z)} = \frac{1}{M-\delta} + \frac{1}{1-\delta},$$

while the caching gain of all other decisions is at most $$\frac{1}{1-\delta}.$$

Any subsequent caching decisions do not change the caching gain. The optimal solution is to cache item 1 at u and item 2 at w, yielding a caching gain of $2/(1-\delta)$. Hence, the greedy solution attains an approximation ratio $$0.5 \cdot \left(1 + \frac{1-\delta}{M-\delta}\right).$$

By appropriately choosing M and $\delta$, this can be made arbitrarily close to 0.5.

---
Algorithm 1 Greedy
---

Input F : $\mathcal{D} \to \mathbb{R}_+, x_0$
1:   $x \leftarrow x_0$
2:   while $A(x) := \{(v,i) \in V \times \mathcal{C} : x + e_{vi} \in \mathcal{D}\}$ is not empty do
3:     $(v^*, i^*) \leftarrow \arg\max_{(v,i)\in A(x)} (F(x + e_{vi}) - F(x))$
4:     $x \leftarrow x + e_{v^*,i^*}$
5:   end while
6:   return x

---

As illustrated in Section 7 herein, the greedy method performs well in practice for some topologies; however, Lemma 3 may include alternative methods, that attain improved approximation guarantees. According to some embodiments, it is easy to extend Lemma 3 to other objectives, including, e.g., expected delay, queue size, etc. According to some embodiments, tight instances can be constructed using caches with capacities larger than 1 (see, e.g., FIG. 3).

5 CONTINUOUS-GREEDY METHOD

According to some embodiments, the continuous-greedy method by Calinescu et al. [1] attains a tighter guarantee than the greedy method, raising the approximation ratio from 0.5 to $1-1/e\approx0.63$. The method maximizes the so-called multilinear extension of objective F, thereby obtaining a fractional solution Y in the convex hull of the constraint space. The resulting solution is then rounded to produce an integral solution. The method requires estimating the gradient of the multilinear extension via sampling; interestingly, embodiments prove that MaxCG exhibits additional structure, which can be used to construct a polynomial-time estimator of this gradient that eschews sampling altogether, by using a Taylor expansion.

---
Algorithm 2 Continuous-Greedy
---

Input G : $\tilde{\mathcal{D}} \to \mathbb{R}_+, x_0$, stepsize $0 < \gamma \leq 1$
1:   $t \leftarrow 0, k \leftarrow 0$ $y_0 \leftarrow x_0$
2:   while $t < 1$ do
3:     $m_k \leftarrow \arg\max_{m\in\tilde{\mathcal{D}}} \langle m, \nabla G(y_k)\rangle$
4:     $\gamma_k \leftarrow \min\{\gamma, 1 - t\}$
5:     $y_{k+1} \leftarrow y_k + \gamma_k m_k, t \leftarrow t + \gamma_k, k \leftarrow k + 1$
6:   end while
7:   return $y_k$

---

5.1 Method Overview

Formally, the multilinear extension of the caching gain F is defined as follows. Define the convex hull of the set defined by the constraints (9b) in MaxCG as:

$$\tilde{\mathcal{D}} = \operatorname{conv}(\{x : x \in \mathcal{D}, x \geq x_0\}) \subseteq [0,1]^{|V||\mathcal{C}|} \quad (10)$$

Intuitively, $y \in \tilde{\mathcal{D}}$ is a fractional vector in $\mathbb{R}^{|V||\mathcal{D}|}$ satisfying the capacity constraints, and the bound $y \geq x_0$.

Given a $y \in \tilde{\mathcal{D}}$, consider a random vector x in $\{0,1\}^{|V||\mathcal{C}|}$ generated as follows: for all $v \in V$ and $i \in \mathcal{C}$, the coordinates $x_{vi} \in \{0,1\}$ are independent Bernoulli variables such that $P(x_{vi}=1)=y_{vi}$. The multilinear extension G: $\tilde{\mathcal{D}} \to \mathbb{R}_+$ of $F: \mathcal{D}_\lambda \to \mathbb{R}_+$ is defined via following expectation $G(y)= \mathbb{E}_y[F(x)]$, parameterized by $y \in \tilde{\mathcal{D}}$, i.e., $$G(y) = \sum_{x\in[0,1]^{|V||\mathcal{C}|}} F(x) \times \prod_{(v,i)\in V\times\mathcal{C}} y_{vi}^{x_{vi}} (1-y_{vi})^{1-x_{vi}}, \quad (11)$$

The continuous-greedy method, summarized in Method 2, proceeds by first producing a fractional vector $y \in \tilde{\mathcal{D}}$. Starting from $y_0=x_0$, the method iterates over:

$$m_k \in \operatorname{argmax}_{m\in\tilde{\mathcal{D}}} \langle m, \nabla G(y_k)\rangle, \quad (12a)$$

$$y_{k+1} = y_k + \gamma_k m_k \quad (12b)$$

for an appropriately selected step size $\gamma_k \in [0,1]$. Intuitively, this yields an approximate solution to the non-convex problem:

Maximize: $G(y)$ (13a)

subj. to $y \in \tilde{\mathcal{D}}$. (13b)

Even though (13) may not be convex, the output of Method 2 is within a $1-1/e$ factor from the optimal solution $y^* \in \tilde{\mathcal{D}}$ of (13). This fractional solution can be rounded to produce a solution to MaxCG with the same approximation guarantee using either the pipage rounding [20] or the swap rounding [1], [33] schemes: for completeness, both are referred to herein in Appendix B.

Note that the maximization in (12a) is a Linear Program (LP): it involves maximizing a linear objective subject to a set of linear constraints, and can thus be computed in polynomial time. However, this presumes access to the gradient $\nabla G$. On the other hand, the expectation $G(y)= \mathbb{E}_y[F(x)]$ alone, given by (11), involves a summation over $2^{|V||\mathcal{C}|}$ terms, and it may not be easily computed in polynomial time. To address this, in some embodiments, an approach is to produce random samples x and use these to produce an unbiased estimate of the gradient (see, e.g., [1]); this estimate can be used in Method 2 instead of the gradient. Before presenting the estimator tailored to MaxGC herein, this sampling-based estimator is described herein.

A Sampling-Based Estimator. Function G is linear when restricted to each coordinate $y_{vi}$, for some $v \in V$, $i \in \mathcal{C}$ (i.e., when all inputs except $y_{vi}$ are fixed). As a result, the partial derivative of G w.r.t. $y_{vi}$ can be written as:

$$\frac{\partial G(y)}{\partial y_{vi}} = \mathbb{E}_y[F(x)|x_{vi}=1] - \mathbb{E}_y[F(x)|x_{vi}=0] \geq 0, \quad (14)$$

where the last inequality is due to monotonicity of F. One can thus estimate the gradient by (a) producing T random samples $x^{(\ell)}$, $\ell=1,\ldots,T$ of the random vector x, consisting of independent Bernoulli coordinates, and (b) computing, for each pair $(v, i) \in V \times \mathcal{C}$, the average $$\frac{\partial \hat{G}(y)}{\partial y_{vi}} = \frac{1}{T}\sum_{\ell=1}^{T}(F([x^\ell]_{+(v,i)}) - F([x^\ell]_{-(v,i)})), \quad (15)$$

where $[x]_{+(v,i)}, [x]_{-(v,i)}$ are equal to vector x with the (v, i)th coordinate set to 1 and 0, respectively. Using this estimate, Method 2 attains an approximation ratio arbitrarily close to $1-1/e$ for appropriately chosen T. In particular, the following theorem holds:

Theorem 2. [Calinescu et al. [1]] Consider Method 2, with $\nabla G(y_k)$ replaced by the sampling-based estimate $\widehat{\nabla G}(y^k)$, given by (15). Set $$T = \frac{10}{\delta^2}(1 + \ln(|C||V|)),$$

and $\gamma = \delta$, where $$\delta = \frac{1}{40|C||V| \cdot \left(\sum_{v \in V} c_v\right)^2}.$$

Then, the method terminates after $K = 1/\gamma = 1/\delta$ steps and, with high probability, $$G(y^K) \geq (1-(1-\delta)^{1/\delta})G(y^*) \geq (1-1/e)G(y^*),$$

where $y^*$ is an optimal solution to (13).

The proof of the theorem can be found in Appendix A of Calinescu et al. [1] for general submodular functions over arbitrary matroid constraints; embodiments state Theorem 2 here with constants T and $\gamma$ set specifically for their objective G and the set of constraints $\tilde{D}$.

Complexity. Under this parametrization of T and $\gamma$, Method 2 runs in polynomial time. More specifically, note that $1/\delta = O(|\mathcal{C}||V| \cdot (\Sigma_{v \in V} c_v)^2)$ is polynomial in the input size. Moreover, the method runs for $K = 1/\delta$ iterations in total. Each iteration requires $$T = O\left(\frac{1}{\delta^2}(1 + \ln(|C||V|)\right)$$

samples, each involving a polynomial computation (as F can be evaluated in polynomial time). LP (12a) can be solved in polynomial time in the number of constraints and variables, which are $O(|V|\|\mathcal{C}|)$. Finally, the rounding schemes presented in Appendix B are also poly-time, both requiring at most $O(|V|\|\mathcal{C}|)$ steps.

5.2 A Novel Estimator Via Taylor Expansion

According to some embodiments, an approach to estimate the gradient via sampling has certain drawbacks. The number of samples T required to attain the $1-1/e$ ratio is quadratic in $|V|\|\mathcal{C}|$. In practice, even for networks and catalogs of moderate size (say, $|V|=|\mathcal{C}|=100$), the number of samples becomes prohibitive (of the order of $10^8$). Producing an estimate for $\nabla G$ via a closed form computation that eschews sampling thus has significant computational advantages. In this section, embodiments illustrate that the multilinear relaxation of the caching gain F admits such a closed-form characterization.

According to some embodiments, a polynomial $f: \mathbb{R}^d \to \mathbb{R}$ is in Weighted Disjunctive Normal Form (W-DNF) if it may be written as $$f(x) = \sum_{s \in \mathcal{S}} \beta_s \cdot \prod_{j \in \mathcal{I}(s)}(1-x_j), \quad (16)$$

for some index set $\mathcal{S}$, positive coefficients $\beta_s > 0$, and index sets $I(s) \subseteq \{1, \ldots, d\}$. Intuitively, treating binary variables $x_j \in \{0,1\}$ as boolean values, each W-DNF polynomial can be seen as a weighted sum (disjunction) among products (conjunctions) of negative literals. These polynomials arise naturally in the context of the problem; in particular:

Lemma 4. For all $k \geq 1$, $x \in \mathcal{D}$, and $e \in E$, $\rho_e^k(x, \lambda)$ is a W-DNF polynomial whose coefficients depend on $\lambda$.

Proof (Sketch). The lemma holds for $k=1$ by (2) and (3). The lemma follows by induction, as W-DNF polynomials over binary $x \in \mathcal{D}$ are closed under multiplication; this is because $(1-x)^\ell = (1-x)$ for all $\ell \geq 1$ when $x \in \{0,1\}$. A detailed proof be found in Appendix C.1.

Hence, all load powers are W-DNF polynomials. Expectations of W-DNF polynomials have a remarkable property:

Lemma 5. Let $f: \mathcal{D}_\lambda \to \mathbb{R}$ be a W-DNF polynomial, and let $x \in \mathcal{D}$ be a random vector of independent Bernoulli coordinates parameterized by $y \in \tilde{\mathcal{D}}$. Then $\mathbb{E}_y[f(x)] = f((y))$, where $f(y)$ is the evaluation of the W-DNF polynomial representing f over the real vector y.

Proof. As f is W-DNF, it may be written as $$f(x) = \sum_{s \in S} \beta_s \prod_{t \in \mathcal{T}(s)}(1-x_t)$$

for appropriate $\mathcal{S}$, and appropriate $\beta_s$, $\mathcal{I}(s)$, where $s \in \mathcal{S}$. Hence, $$\mathbb{E}_y[f(x)] = \sum_{s \in S} \beta_s \mathbb{E}_y[\prod_{t \in \mathcal{T}(s)}(1-x_t)]$$

$$\phantom{\mathbb{E}_y[f(x)]} = \sum_{s \in S} \beta_s \prod_{t \in \mathcal{T}(s)}(1-\mathbb{E}_y[x_t]), \text{ by independence}$$

$$\phantom{\mathbb{E}_y[f(x)]} = \sum_{s \in S} \beta_s \prod_{t \in \mathcal{T}(s)}(1-y_t).$$

Lemma 5 states that, to compute the expectation of a W-DNF polynomial f over i.i.d. Bernoulli variables with expectations y, it suffices to evaluate f over input y. Expectations computed this way therefore do not require sampling.

Embodiments leverage this property to approximate $\nabla G(y)$ by taking the Taylor expansion of the cost functions $C_e$ at each edge $e \in E$. Embodiments enable $C_e$ as a power series w.r.t. $\rho_e^k$, $k \geq 1$; from Lemmas 4 and 5, embodiments can compute the expectation of this series in a closed form. In particular, by expanding the series and rearranging terms it is easy to show the following lemma:

Lemma 6. Consider a cost function $C_e: [0,1) \to \mathbb{R}_+$ which satisfies Assumption 1 and for which the Taylor expansion exists at some $\rho^* \in [0,1)$. Then, for $x \in \mathcal{D}$ a random Bernoulli vector parameterized by $y \in \tilde{\mathcal{D}}$, $$\frac{\partial G(y)}{\partial y_{vi}} \approx \sum_{e \in E} \sum_{k=1}^{L} \alpha_e^{(k)} [\rho_e^k([y]_{-(v,i)}, \lambda) - \rho_e^k([y]_{+(v,i)}, \lambda)] \quad (17)$$

where, $$\alpha_e^{(k)} = \sum_{i=k}^{L} \frac{(-1)^{i-k} \binom{i}{k}}{i!} C_e^{(i)}(\rho^*)(\rho^*)^{i-k}$$

for $k = 0, 1, \ldots, L$, and the error of the approximation is:

$$\frac{1}{(L+1)!} \Sigma_{e \in E}$$
$$C_e^{(L+1)}(\rho') [\mathbb{E}_{[y]_{-v,i}}[(\rho_e(x, \lambda) - \rho^*)^{L+1}] - \mathbb{E}_{[y]_{+v,i}}[(\rho_e(x, \lambda) - \rho^*)^{L+1}]].$$

Proof. The Taylor expansion of $C_e$ at $\rho^*$ is given by:

$$C_e(\rho) = C_e(\rho^*) + \sum_{k=1}^{L} \frac{1}{k!} C_e^{(k)}(\rho^*)(\rho - \rho^*)^k + + \frac{1}{(L+1)!} C_e^{(L+1)}(\rho')(\rho - \rho^*)^{L+1},$$

where $\rho' \in [\rho^*, \rho]$ and $C_e^{(k)}$ is the k-th order derivative of $C_e$. By expanding this polynomial and reorganizing the terms, some embodiments get $$C_e(\rho) = \sum_{k=0}^{L} \alpha_e^{(k)} \rho^{(k)} + \frac{1}{(L+1)!} C_e^{(L+1)}(\rho')(\rho - \rho^*)^{L+1},$$

where $$\alpha_e^{(k)} = \sum_{i=k}^{L} \frac{(-1)^{i-k} \binom{i}{k}}{i!} C_e^{(i)}(\rho^*)(\rho^*)^{i-k},$$

for $k = 0, 1, \ldots, L$. Consider now the L-th order Taylor approximation of $C_e$, given by $$\hat{C}_e(\rho) = \sum_{k=0}^{L} \alpha_e^{(k)} \rho^k.$$

Clearly, this is an estimator of $C_e$, with an error of the order $|C_e(\rho) - \hat{C}_e(\rho)| = o((\rho - \rho_*)^L)$. Thus, for $x \in \mathcal{D}$ a random Bernoulli vector parameterized by $y \in \tilde{\mathcal{D}}$, $$\mathbb{E}_y[C_e(\rho_e(x, \lambda))] \approx \mathbb{E}_y[\hat{C}_e(\rho_e(x, \lambda))] = \sum_{k=0}^{L} \alpha_e^{(k)} \mathbb{E}_y[\rho_e^k(x, \lambda)] \quad (18)$$

On the other hand, for all $v \in V$ and $i \in \mathcal{C}$:

$$\frac{\partial G(y)}{\partial y_{vi}} \stackrel{(14)}{=} \mathbb{E}_y[F(x) | x_{vi} = 1] - \mathbb{E}_y[F(x) | x_{vi} = 0] \quad (19)$$

$$\stackrel{(9a)}{=} \mathbb{E}_y[C(x) | x_{vi} = 0] - \mathbb{E}_y[C(x) | x_{vi} = 1]$$

$$\stackrel{(7a),(18)}{\approx} \sum_{e \in E} \sum_{k=1}^{L} \alpha_e^k (\mathbb{E}_y[\rho_e^k(x, \lambda) | x_{vi} = 0] - \mathbb{E}_y[\rho_e^k(x, \lambda) | x_{vi} = 1]),$$

where the error of the approximation is given by $$\frac{1}{(L+1)!} \sum_{e \in E} C_e^{(L+1)}(\rho')$$

$$[\mathbb{E}_y[(\rho_e(x, \lambda) - \rho^*)^{L+1} | x_{vi} = 0] - \mathbb{E}_y[(\rho_e(x, \lambda) - \rho^*)^{L+1} | x_{vi} = 1]]$$

The lemma thus follows from Lemmas 4 and 5.

Estimator (17) is deterministic: no random sampling is required. Moreover, Taylor's theorem enables characterizing the error (i.e., the bias) of this estimate. We use this to characterize the final fractional solution y produced by Method 2:

Theorem 3. Assume that all $C_e$, $e \in E$, satisfy Assumption 1, are $L+1$-differentiable, and that all their $L+1$ derivatives are bounded by $W \geq 0$. Then, consider Method 2, in which $\nabla G(y_k)$ is estimated via the Taylor estimator (17), where each edge cost function is approximated at $\rho_e^* = \mathbb{E}_{y_k}[\rho_e(x, \lambda)] = \rho_e(\gamma_k, \lambda)$. Then, $$G(y_K) \geq \left(1 - \frac{1}{e}\right) G(y^*) - 2DB - \frac{P}{2K}, \quad (20)$$

where $$K = \frac{1}{\gamma}$$

is the number of iterations, $y^*$ is an optimal solution to (13), $$D = \max_{y \in \tilde{\mathcal{D}}} \|y\|_2 \leq |V| \cdot \max_{v \in V} c_v,$$

is the diameter of $\tilde{\mathcal{D}}$, $$B \leq \frac{W|E|}{(L+1)!}$$

is the bias of estimator (17), and $P = 2C(x_0)$, is a Lipschitz constant of $\nabla G$.

The proof can be found in Appendix C.2. The theorem immediately implies that some embodiments can replace

(17) as an estimator in Method 2, and attain an approximation arbitrarily close to 1−1/e.

Estimation via Power Series. For arbitrary L+1-differentiable cost functions $C_e$, the estimator (17) can be leveraged by replacing $C_e$ with its Taylor expansion. In the case of queue-dependent cost functions, as described in Example 4 of Section 3.2, the power-series (8) can be used instead. For example, the expected queue size (Example 1, Section 3.2), is given by $$C_e(\rho_e) = \frac{\rho_e}{1-\rho_e} = \sum_{k=1}^{\infty} \rho_e^k.$$

In contrast to the Taylor expansion, this power series does not depend on a point $\rho_e^*$ around which the function $C_e$ is approximated.

6 BEYOND M/M/1 QUEUES

As discussed in Section 3 herein, the classes of M/M/1 queues for which the supermodularity of the cost functions arises is quite broad, and includes FIFO, LIFO, and processor sharing queues. According to some embodiments, Section 6 herein illustrates how results extend to even broader families of queuing networks. Chapter 3 of Kelly [2] provides a general framework for a set of queues for which service times are exponentially distributed; also summarized in Appendix A.2 herein. A large class of networks can be modeled by this framework, including networks of M/M/k queues; all such networks maintain the property that steady-state distributions have a product form. This enables some embodiments to extend results to M/M/k queues for two cost functions $C_e$:

Lemma 7. For a network of M/M/k queues, both the queuing probability and the expected queue size are non-increasing and supermodular over sets $\{\text{supp}(x): x \in \mathcal{D}_\lambda\}$. This is given by the so-called Erlang C formula [31].

According to some embodiments, as an immediate consequence of Lemma 7 and Little's theorem, both the sum of the expected delays per queue, but also the expected delay of an arriving packet, are also supermodular and non-decreasing.

Product-form steady-state distributions arise also in settings where service times are not exponentially distributed. A large class of quasi-reversible queues, named symmetric queues exhibit this property (c.f. Section 3.3 of [2] and Chapter 10 of [4]). Symmetric queues are presented in Appendix A.3 herein. In the following lemma embodiments leverage the product form of symmetric queues to extend results to M/D/1 symmetric queues [31].

Lemma 8. For a network of M/D/1 symmetric queues, the expected queue size is non-increasing and supermodular over sets $\{\text{supp}(x): x \in \mathcal{D}_\lambda\}$.

Again, Lemma 8 and Little's theorem imply that this property also extends to network delays. It is worth noting that conclusions similar to these in Lemmas 7 and 8 are not possible for all general queues with product form distributions. In particular, also embodiments prove the following negative result:

Lemma 9. There exists a network of M/M/1/k queues, containing a queue e, for which no strictly monotone function $C_e$ of the load $\rho_e$ at a queue e is non-increasing and supermodular over sets $\{\text{supp}(x): x \in \mathcal{D}_\lambda\}$. In particular, the expected size of queue e is neither monotone nor supermodular.

The proofs for all the Lemmas of this section, i.e., Lemmas 7 to 9 can be found in Section D.

7 NUMERICAL EVALUATION

TABLE 1

Graph Topologies and Experiment Parameters

| Graph | $|V|$ | $|E|$ | $|\mathcal{C}|$ | $|\mathcal{R}|$ | $|Q|$ | $c_v$ | $F_{PL}(x_{RND})$ | $F_{UNI}(x_{RND})$ |
|---|---|---|---|---|---|---|---|---|
| ER | 100 | 1042 | 300 | 1K | 4 | 3 | 2.75 | 2.98 |
| ER-20Q | 100 | 1042 | 300 | 1K | 20 | 3 | 3.1 | 2.88 |
| HC | 128 | 896 | 300 | 1K | 4 | 3 | 2.25 | 5.23 |
| HC-20Q | 128 | 896 | 300 | 1K | 20 | 3 | 2.52 | 5.99 |
| star | 100 | 198 | 300 | 1K | 4 | 3 | 6.08 | 8.3 |
| path | 4 | 3 | 2 | 2 | 1 | 1 | 1.2 | 1.2 |
| dtelekom | 68 | 546 | 300 | 1K | 4 | 3 | 2.57 | 3.66 |
| abilene | 11 | 28 | 4 | 2 | 2 | 1/2 | 4.39 | 4.39 |
| geant | 22 | 66 | 10 | 100 | 4 | 2 | 19.68 | 17.22 |

Figure 2:
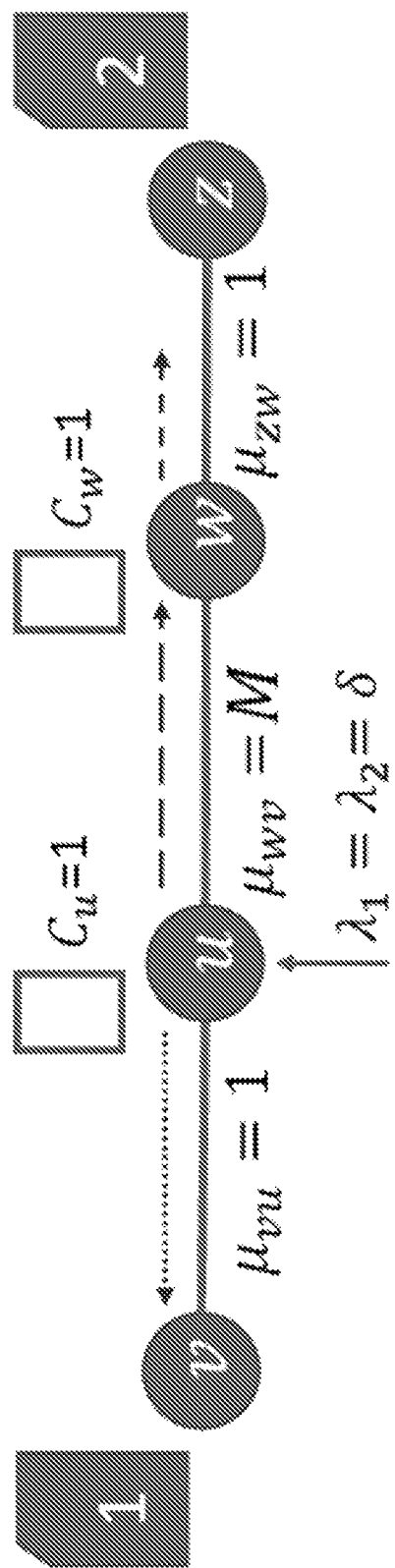
FIG. 2 is a path graph of caching at nodes of a network, according to some embodiments.
Figure 3:
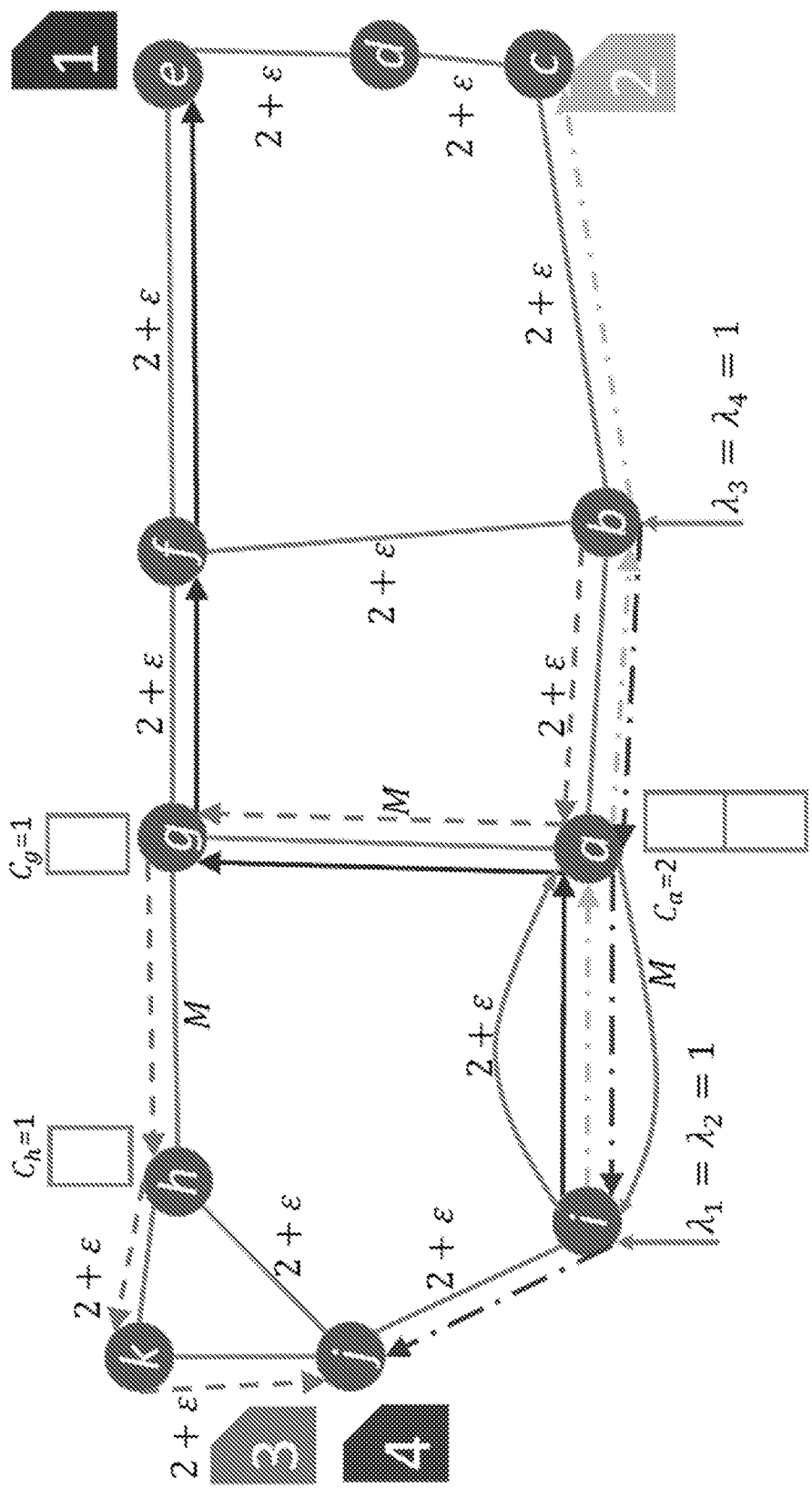
FIG. 3 illustrates a network topology in which some embodiments may be configured to operate.

Networks. Embodiments employ Methods 1 and 2 over 9 network topologies, summarized in Table 2. Graphs ER and ER-20Q are the same 100-node Erdős-Rényi graph with parameter p=0.1. Graphs HC and HC-20Q are the same hypercube graph with 128 nodes, and graph star is a star graph with 100 nodes. The graph path is the topology shown in FIG. 2. The last 3 topologies, namely, dtelekom, geant, and abilene represent the Deutsche Telekom, GEANT, and Abilene backbone networks, respectively. The latter is also shown in FIG. 3.

Experimental Setup. For path and abilene, embodiments set demands, storage capacities, and service rates as illustrated in FIGS. 2 and 3, respectively. Both of these settings induce an approximation ratio close to ½ for greedy. For all remaining topologies, embodiments consider a catalog of size $|\mathcal{C}|$ objects; for each object, embodiments select 1 node uniformly at random (u.a.r.) from V to serve as the designated server for this object. To induce traffic overlaps, embodiments also select $|Q|$ nodes u.a.r. that serve as sources for requests; all requests originate from these sources. All caches are set to the same storage capacity, i.e., $c_v=c$ for all $v \in V$. Embodiments generate a set of $|\mathcal{R}|$ possible types of requests. For each request type $r \in \mathcal{R}$, $\lambda^r=1$ request per second, and path $p^r$ is generated by selecting a source among the $|Q|$ sources u.a.r., and routing towards the designated server of object $i^r$ using a shortest path method. Embodiments consider two ways of selecting objects $i^r \in \mathcal{C}$: in the uniform regime, $i^r$ is selected u.a.r. from the catalog $\mathcal{C}$; in the power-law regime, $i^r$ is selected from the catalog $\mathcal{C}$ via a power law distribution with exponent 1.2. All the parameter values, e.g., catalog size $|\mathcal{C}|$, number of requests $|\mathcal{R}|$, number of query sources $|Q|$, and caching capacities $c_v$, are presented in Table 2.

Embodiments construct heterogeneous service rates as follows. Every queue service rate is either set to a low value $\mu_e=\mu_{low}$ or a high value $\mu_e=\mu_{high}$, for all $e \in E$. Embodiments select $\mu_{low}$ and $\mu_{high}$ as follows. Given the demands $r \in \mathcal{R}$ and the corresponding arrival rates $\lambda^r$, some embodiments compute the highest load under no caching (x=0), i.e., some embodiments find $\lambda_{max}=\max_{e \in E} \sum_{r:e \in p^r} \lambda^r$. We then set $\mu_{low}=\lambda_{max} \times 1.05$ and $\mu_{high}=\lambda_{max} \times 200$. We set the service rate to $\mu_{low}$ for all congested edges, i.e., edges e s.t. $\lambda_e=\lambda_{max}$. Embodiments set the service rate for each remaining edge $e \in E$ to $\mu_{low}$ independently with probability 0.7, and to $\mu_{high}$ otherwise. Note that, as a result $0 \in \mathcal{D}_\lambda = \mathcal{D}$, i.e., the system is stable even in the absence of caching and, on average, 30 percent of the edges may have a high service rate.

Placement Methods. Some embodiments include several placement methods: (a) Greedy, i.e., the greedy method (Alg. 1), (b) Continuous-Greedy with Random Sampling (CG-RS), i.e., Method 2 with a gradient estimator based on sampling, as described in Section 5.1, (c) Continuous-Greedy with Taylor approximation (CGT), i.e., Method 2 with a gradient estimator based on the Taylor expansion, as described in Section 5.2, and (d) Continuous-Greedy with Power Series approximation (CG-PS), i.e., Method 2 with a gradient estimator based on the power series expansion, described also in Section 5.2. In the case of CG-RS, some embodiments collect 500 samples, i.e., T=500. In the case of CG-PS, some embodiments include the first and second order expansions of the power series as CG-PS1 and CG-PS2, respectively. In the case of CGT, some embodiments include the first-order expansion (L=1). In both cases, subsequent to the execution of Method 2 some embodiments include produce an integral solution in $\mathcal{D}$ by rounding via the swap rounding method [33]. All continuous-greedy methods use $\gamma=0.001$. Some embodiments also implement a random selection method (RND), which caches $c_v$ items at each node $v \in V$, selected uniformly at random. Some embodiments repeat RND 10 times, and report the average running time and caching gain.

Figure 5:
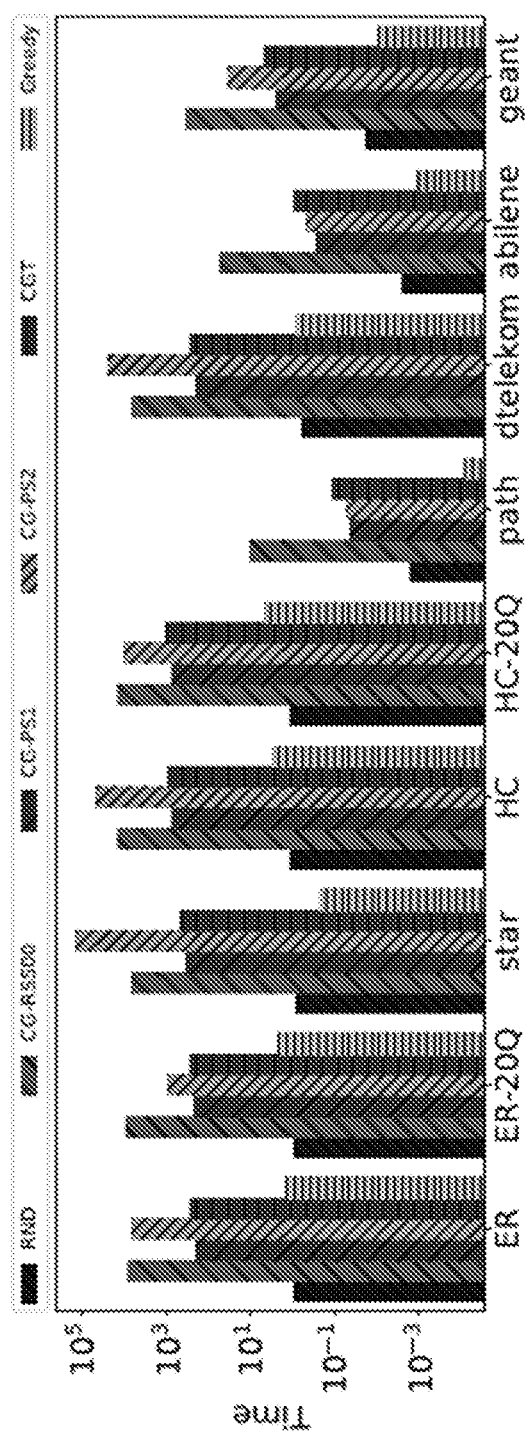
FIG. 5 illustrates running time for various network topologies in which some embodiments may be configured to operate.

Caching Gain Across Different Topologies. The caching gain F(x) for x generated by different placement methods, is shown for power-law arrival distribution and uniform arrival distribution in FIGS. 4a and 4b, respectively. The values are normalized by the gains obtained by RND, reported in Table 2. Also, the running times of the methods for power-law arrival distribution are reported in FIG. 5. As is illustrated in FIGS. 4A-B, Greedy is comparable to other methods in most topologies. However, for topologies path and abilene Greedy obtains a sub-optimal solution, in comparison to the continuous-greedy method. In fact, for path and abilene Greedy performs even worse than RND. In FIGS. 4A-B, according to some embodiments, the continuous-greedy methods with gradient estimators based on Taylor and Power series expansion, i.e., CG-PS1, CG-PS2, and CGT outperform CG-RS500 in most topologies. Also, FIG. 5 illustrates that CG-RS500 runs 100 times slower than the continuous-greedy methods with first-order gradient estimators, i.e., CG-PS1 and CGT. Note that 500 samples are significantly below the value, stated in Theorem 2, needed to attain the theoretical guarantees of the continuous-greedy method, which is quadratic in $|V||\mathcal{C}|$.

Figures 6A, 6B:
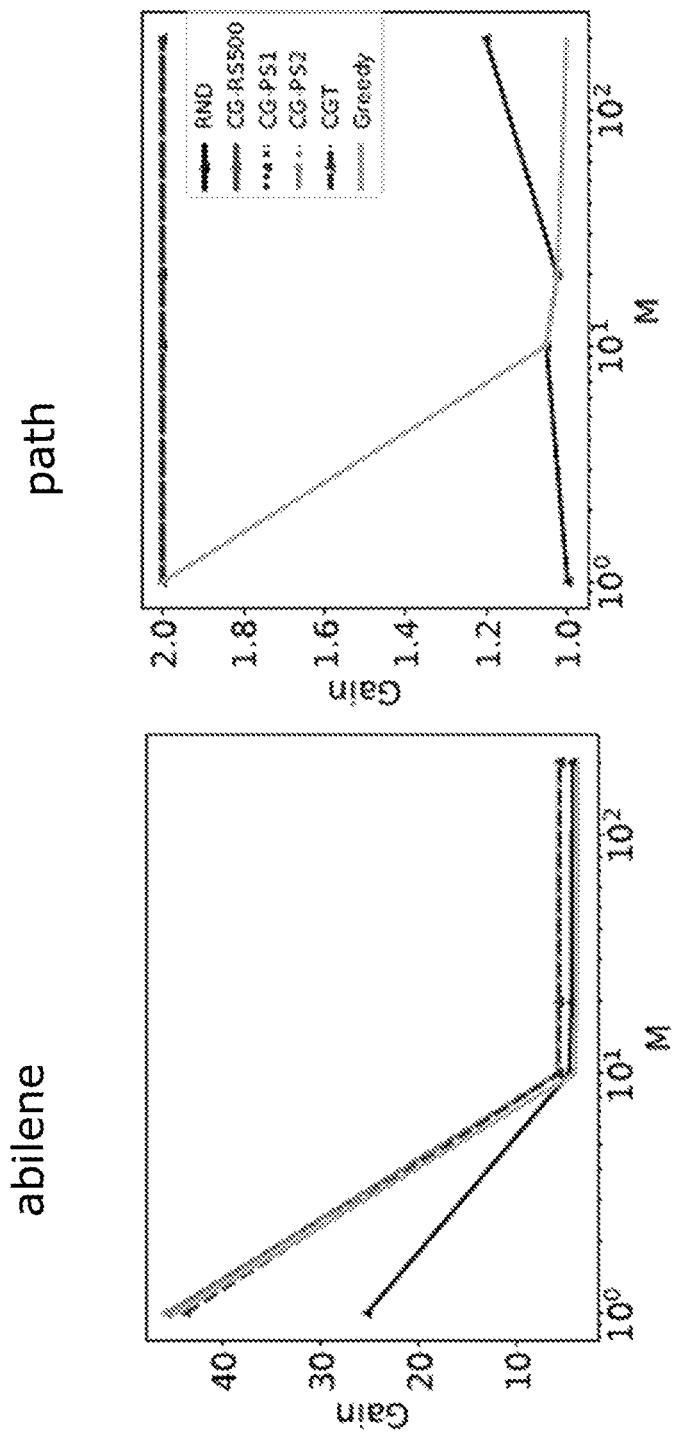
FIGS. 6A-B illustrate caching gain for varying service rates for various network topologies in which some embodiments may be configured to operate.

Varying Service Rates. For topologies path and abilene, the approximation ratio of Greedy is ≈0.5. This ratio is a function of service rate of the high-bandwidth link M. In this experiment, some embodiments explore the effect of varying M on the performance of the methods in more detail. Some embodiments plot the caching gain obtained by different methods for path and abilene topologies, using different values of $M \in \{M_{min}, 10, 20, 200\}$, where $M_{min}$ is the value that puts the system on the brink of instability, i.e., 1 and 2+ε for path and abilene, respectively. Thus, some embodiments gradually increase the discrepancy between the service rate of low-bandwidth and high-bandwidth links. The corresponding caching gains are plotted in FIGS. 6A-B, as a function of M. Some embodiments see that as M increases the gain attained by Greedy worsens in both topologies: when $M=M_{min}$ Greedy matches the performance of the continuous-greedy methods, in both cases. However, for higher values of M it is beaten not only by all variations of the continuous-greedy method, but by RND as well.

Figures 7A, 7B:
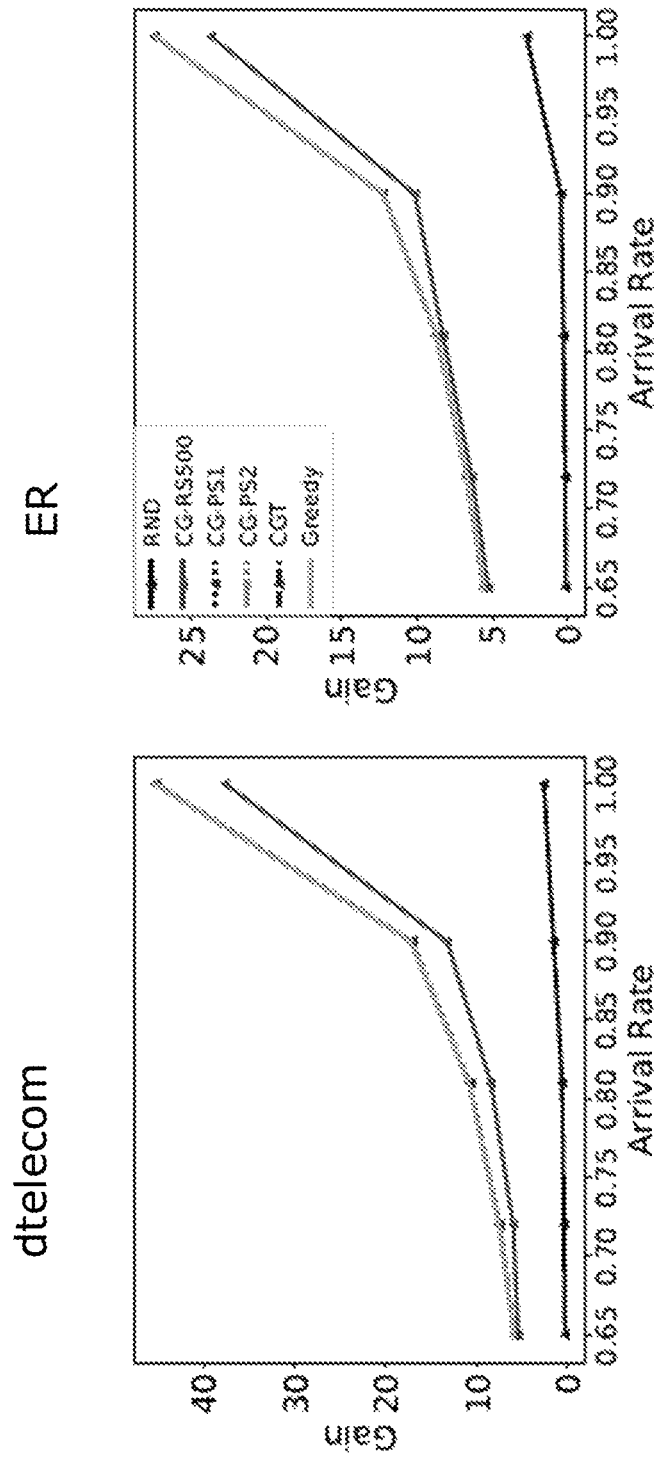
FIGS. 7A-B illustrate caching gain for varying arrival rates for various network topologies in which some embodiments may be configured to operate.

Effect of Congestion on Caching Gain. In this experiment, some embodiments study the effect of varying arrival rates $\lambda^r$ on caching gain F. Some embodiments report results only for the dtelekom and ER topologies and power-law arrival distribution. Some embodiments obtain the cache placements x using the parameters presented in Table 2 and different arrival rates: $\lambda^r \in \{0.65, 0.72, 0.81, 0.9, 1.0\}$, for $r \in \mathcal{R}$. FIGS. 7A-B show the caching gain attained by the placement methods as a function of arrival rates. Some embodiments observe that as arrival rates increase, the caching gain attained by almost all methods, except RND, increases significantly. Moreover, CG-PS1, CG-PS2, CGT, and Greedy have a similar performance, while CG-RS500 achieves lower caching gains.

Figures 8A, 8B:
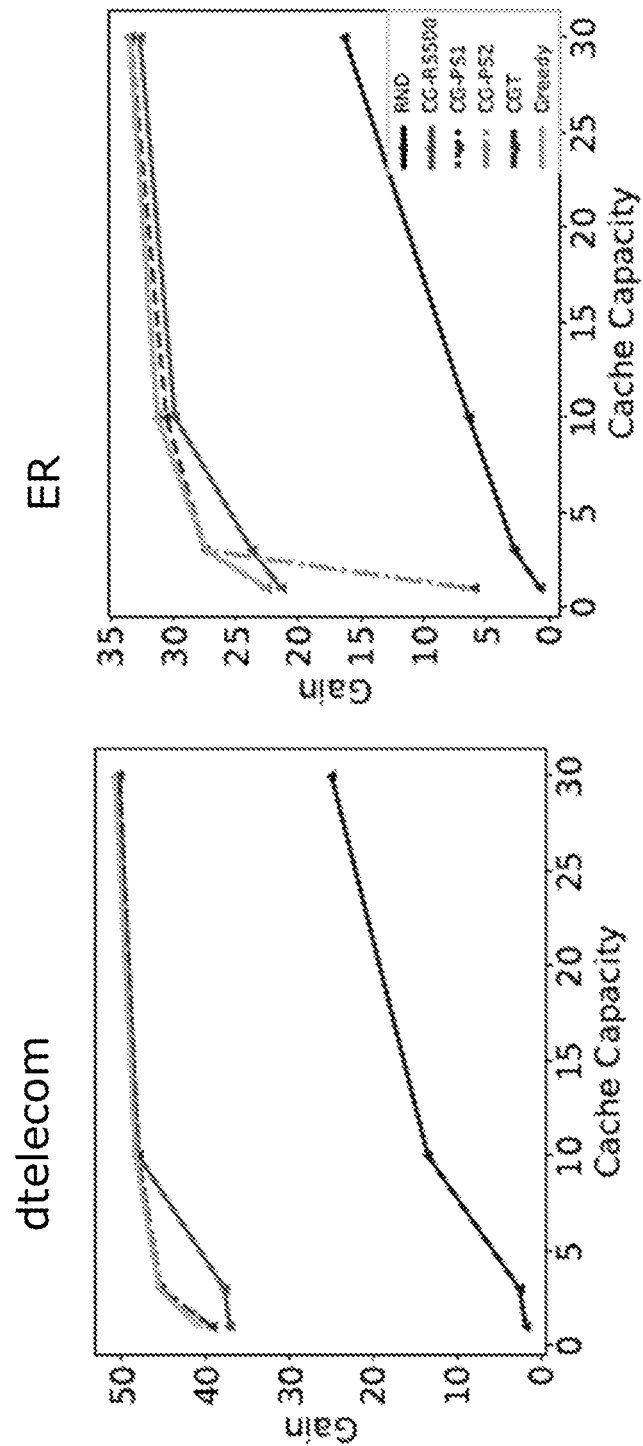
FIGS. 8A-B illustrate caching gain for varying cache capacities for various network topologies in which some embodiments may be configured to operate.

Varying Caching Capacity. In this experiment, some embodiments study the effect of increasing cache capacity $c_v$ on the acquired caching gains. Again, some embodiments report the results only for the dtelekom and ER topologies and power-law arrival distribution. We evaluate the caching gain obtained by different placement methods using the parameters of Table 2 and different caching capacities: $c_v \in \{1, 3, 10, 30\}$ for $v \in V$. The caching gain is plotted in FIGS. 8A-B. As some embodiments illustrate, in all cases the obtained gain increases, as caching capacities increase. This is expected: caching more items reduces traffic and delay, increasing the gain.

8 CONCLUSIONS

Embodiments herein provide feasible object placements targeting many design objectives of interest, including system size and delay, can be determined using combinatorial techniques. Some embodiments include characterization of approximable objectives for certain classes of queues, including M/M/1/k queues, open. Some embodiments also solve problems relating to stability. Some embodiments perform characterization of the stability region of arrival rates $\Lambda = \cup_{x \in \mathcal{D}} \Lambda(x)$. Some embodiments determine membership in this set (or, equivalently, given $\lambda$, determining whether there exists a $x \in \mathcal{D}$ under which the system is stable) is NP-hard or not, and this region can be approximated by embodiments. Methods presented herein may be offline: identifying how to determine placements in an online, distributed fashion, in a manner that attains a design objective (as in [8], [21]), or even stabilizes the system (as in [7]), remains an important open problem.

APPENDIX A

Kelly Networks and Networks of Symmetric Queues

A.1 Kelly Networks Under M/M/1 Queues

Kelly networks [2], [3], [4] (i.e., multi-class Jackson networks) are networks of queues operating under a fairly general service disciplines (including FIFO, LIFO, and processor sharing, to name a few). As illustrated in FIG. 1A, a Kelly network can be represented by a directed graph G (V, E), in which each edge is associated with a queue. In the case of First-In First-Out (FIFO) queues, each edge/link $e \in E$ is associated with an M/M/1 queue with service rate $\mu_e \geq 0$. In an open network, packets of exogenous traffic arrive, are routed through consecutive queues, and subsequently exit the network; the path followed by a packet is determined by its class.

Formally, let $\mathcal{R}$ be the set of packet classes. For each packet class $r \in \mathcal{R}$, embodiments denote by $p^r \subseteq V$ the simple path of adjacent nodes visited by a packet. Packets of class r∈$\mathcal{R}$ arrive according to an exogenous Poisson arrival process with rate $\lambda^r > 0$, independent of other arrival processes and service times. Upon arrival, a packet travels across nodes in $p^r$, traversing intermediate queues, and exits upon reaching the terminal node in $p^r$.

A Kelly network forms a Markov process over the state space determined by queue contents. In particular, let $n_e^r$ be the number of packets of class $r \in \mathcal{R}$ in queue $e \in E$, and $n_e = \sum_{r \in \mathcal{R}} n_e^r$ be the total queue size. The state of a queue $n_e \in \mathcal{R}^{n_e}$, $e \in E$, is the vector of length $n_e$ representing the class of each packet in each position of the queue. The system state is then given by $n = [n_e]_{e \in E}$; embodiments denote by $\Omega$ the state space of this Markov process.

The aggregate arrival rate $\lambda_e$ at an edge $e \in E$ is given by $\lambda_e = \sum_{r:e \in p^r} \lambda^r$, while the load at edge $e \in E$ is given by $\rho_e = \lambda_e / \mu_e$. Kelly's extension of Jackson's theorem [2] states that, if $\rho_e < 1$ for all $e \in E$, the Markov process $\{n(t); t \geq 0\}_{t \geq 0}$ is positive recurrent, and its steady-state distribution has the following product form:

$$\pi(n) = \prod_{e \in E} \pi_e(n_e), n \in \Omega, \quad (21)$$

where $$\pi_e(n_e) = (1 - \rho_e) \prod \left(\frac{\lambda^r}{\mu_e}\right)^{n_e^r}. \quad (22)$$

As a consequence, the queue sizes $n_e$, $e \in E$, also have a product form distribution in steady state, and their marginals are given by:

$$P[n_e = k] = (1 - \rho_e)\rho_e^k, k \in \mathbb{N}. \quad (23)$$

A.2 General Kelly Networks

The steady-state distribution (21) holds for many different service principles beyond FIFO (c.f. Section 3.1 of [2]). In short, incoming packets can be placed in random position within the queue according to a given distribution, and the (exponentially distributed) service effort can be split across different positions, possibly unequally; both placement and service effort distributions are class-independent. This captures a broad array of policies including FIFO, Last-In First-Out (LIFO), and processor sharing: in all cases, the steady-state distribution is given by (21).

In general Kelly networks, queue $e \in \{1, 2, \ldots, |E|\}$, assuming it contains $n_e$ packets in the queue, operates in the following manner:

1) Each packet (customer) requires an exponentially distributed amount of service.
2) A total service effort is provided by queue e at the rate $\mu_e(n_e)$.
3) The packet in position l in the queue is provided with a portion $\gamma_e(l, n_e)$ of the total service effort, for $l = 1, 2, \ldots, n_e$; when this packet completes service and leaves the queue, packets in positions $l+1, l+2, \ldots, n_e$ move down to positions $l, l+1, \ldots, n_e - 1$, respectively.
4) An arriving packet at queue j moves into position l, for $l = 1, 2, \ldots, n_e$, with probability $\delta_e(l, n_e + 1)$; packets that where in positions $l, l+1, \ldots, n_e + 1$, move up to positions $l+1, l+2, \ldots, n_e + 1$, respectively.

Clearly, some embodiments include $\mu_e(n_e) > 0$ for $n_e > 0$; in addition, $$\sum_{l=1}^{n_e} \gamma_e(l, n_e) = 1, \quad (24)$$

$$\sum_{l=1}^{n_e} \delta_e(l, n_e) = 1. \quad (25)$$

Kelly's theorem [2] states that, if $\rho_e < 1$ for all $e \in E$, the state of queue e in equilibrium is independent of the rest of the system, hence, it may have a product form. In addition, the probability that queue e contains $n_e$ packets is $$\pi_e(n_e) = b_e \frac{\lambda_e^{n_e}}{\prod_{l=1}^{n_e} \mu_e(l)}, \quad (26)$$

where $b_e$ is the normalizing factor. As is illustrated from (30), note that the steady-state distribution may not be a function of $\gamma_e$'s, and $\delta_e(l, n_e + 1)$'s, and hence, is independent of the packet placement and service allocation distributions.

According to some embodiments, by allowing $\mu_e(l) = mu_e$, embodiments obtain the results in (23).

A.3 Networks of Symmetric Queues

Let $n_e$ be the number of packets placed in positions $1, 2, \ldots, n$ in queue $e \in E$. Queue e is defined as symmetric queue if it operates in the following manner 1) The service requirement of a packet is a random variable whose distribution may depend upon the class of the customer.
2) A total service effort is provided by queue e at the rate $\mu_e(n_e)$.
3) The packet in position l in the queue is provided with a portion $\gamma_e(l, n_e)$ of the total service effort, for $l = 1, 2, \ldots, n_e$; when this packet completes service and leaves the queue, packets in positions $l+1, l+2, \ldots, n_e$ move down to positions $l, l+1, \ldots, n_e - 1$, respectively.
4) An arriving packet at queue e moves into position l, for $l = 1, 2, \ldots, n_e$, with probability $\gamma_e(l, n_e + 1)$; packets that where in positions $l, l+1, \ldots, n_e + 1$, move up to positions $l+1, l+2, \ldots, n_e + 1$, respectively.

Similarly, some embodiments include $\mu_e(n_e) > 0$ for $n_e > 0$; in addition, $$\sum_{l=1}^{n_e} \gamma_e(l, n_e) = 1, \quad (27)$$

As shown in [2], and [4], symmetric queues have product form steady-state distributions. In particular, it turns out the probability of there are $n_e$ packets in queue e is similar to that given by (26).

APPENDIX B

Rounding

Several poly-time methods can be used to round the fractional solution that is produced by Method 2 to an integral $x \in \mathcal{D}$. Embodiments may include such rounding methods: pipage rounding [20], which is deterministic, and swap-rounding [33], which may be randomized. Embodiments may also include [8], [20] for pipage rounding, and [33] for swap rounding.

According to some embodiments, pipage rounding uses the following property of G: given a fractional solution $y \in \bar{\mathcal{D}}$, there are at least two fractional variables $y_{vi}$ and $y_{v'i'}$, such that transferring mass from one to the other, 1) makes at least one of them 0 or 1, 2) the new ŷ remains feasible in $\tilde{\mathcal{D}}$, and 3) G(ŷ)≥G(y(1)), that is, the expected caching gain at ŷ is at least as good as y. This process is repeated until ŷ does not have any fractional element, at which point pipage rounding terminates and return ŷ. This procedure has a run-time of $O(|V|\|\mathcal{C}|)$ [8], and since each rounding step can only increase G, it follows that the final integral $\hat{y} \in \mathcal{D}$ must satisfy $$F(\hat{y}) = G(\hat{y}) \geq \mathbb{E}[G(y)] \geq \left(1 - \frac{1}{e}\right) G(y^*) \geq \left(1 - \frac{1}{e}\right) F(x^*),$$

where x* is an optimal solution to MaxCG. Here, the first equality holds because F and G are equal when their arguments are integral, while the last inequality holds because (13) is a relaxation of MaxCG, maximizing the same objective over a larger domain.

According to some embodiments, in swap rounding, given a fractional solution $y \in \tilde{\mathcal{D}}$ produced by Method 2 observe that it may be written as a convex combination of integral vectors in $\mathcal{D}$, i.e., $y = \sum_{k=1}^{K} \gamma_k m_k$, where $\gamma_k \in [0,1]$, $\sum_{k=1}^{K} \gamma_k = 1$, and $m_k \in \mathcal{D}$. Moreover, by construction, each such vector $m_k$ is maximal, in that all capacity constraints are tight. Swap rounding iteratively merges these constituent integral vectors, producing an integral solution. At each iteration i, the present integral vector $c_k$ is merged with $m_{k+1} \in \mathcal{D}$ into a new integral solution $c_{k+1} \in \mathcal{D}$ as follows: if the two solutions $c_k$, $m_{k+1}$ differ at a cache $v \in V$, items in this cache are swapped to reduce the set difference: either an item i in a cache in $c_k$ replaces an item j in $M_{k+1}$, or an item j in $M_{k+1}$ replaces an item i in $c_k$; the former occurs with probability proportional to $\sum_{\ell=1}^{k} \gamma_\ell$, and the latter with probability proportional to $\gamma_{k+1}$. The swapping is repeated until the two integer solutions become identical; this merged solution becomes $c_{k+1}$. This process terminates after K−1 steps, after which all the points $m_k$ are merged into a single integral vector $c_K \in \mathcal{D}$. Observe that, in contrast to pipage rounding, swap rounding does not require any evaluation of the objective F during rounding. This makes swap rounding significantly faster to implement; this comes at the expense of the approximation ratio, however, as the resulting guarantee 1−1/e is in expectation.

APPENDIX C

Continuous Greedy with Taylor-Expansion Gradient Estimation

C.1 Proof of Lemma 4

Embodiments prove this by induction on k≥1. Observe first that, by (3), the load on each edge e=(u, v)∈E can be written as a polynomial of the following form:

$$\rho_e(x, \lambda) = \sum_{r \in \mathcal{R}_e} \beta_r(\lambda) \cdot \prod_{j \in \mathcal{I}_e(r)} (1 - x_j), \quad (28)$$

for appropriately defined $\mathcal{R}_e = \mathcal{R}_{(u,v)} = \{r \in \mathcal{R} : (v,u) \in p^r\}$, $\mathcal{I}_e(r) = \{(w, i^p) \in V \times \mathcal{C} : w \in p^r, k_{p^r}(w) \leq k_{p^r}(v)\}$, and $\beta_r(\lambda) = \lambda^r / \mu_e$, In other words, $\rho_e: \mathcal{D}_\lambda \to \mathbb{R}$ is a W-DNF polynomial. For the induction step, observe that W-DNF polynomials, seen as functions over the integral domain $\mathcal{D}_\lambda$, are closed under multiplication. In particular, the following lemma holds:

Lemma 10. Given two W-DNF polynomials $f_1: \mathcal{D}_\lambda \to \mathbb{R}$ and $f_2: \mathcal{D}_\lambda \to \mathbb{R}$, given by $$f_1(x) = \sum_{r \in \mathcal{R}_1} \beta_r \prod_{t \in \mathcal{I}_1(r)} (1 - x_t), \text{ and}$$

$$f_2(x) = \sum_{r \in \mathcal{R}_2} \beta_r' \sum_{i \in \mathcal{I}_2(r)} (1 - x_t),$$

their product $f_1 \cdot f_2$ is also a W-DNF polynomial over $\mathcal{D}_\lambda$, given by:

$$(f_1 \cdot f_2)(x) = \sum_{r \in \mathcal{R}_1, r' \in \mathcal{R}_2} \beta_r \beta_{r'}' \prod_{t \in \mathcal{I}_1(r) \cup \mathcal{I}_2(r')} (1 - x_t)$$

Proof. To see this, observe that $$f_1(x) f_1(x) = \sum_{r \in \mathcal{R}_1, r' \in \mathcal{R}_2} \beta_r \beta_{r'}' \prod_{t \in \mathcal{I}_1(r) \cap \mathcal{I}_2(r')} (1 - x_t)^2 \prod_{t \in \mathcal{I}_1(r) \Delta \mathcal{I}_2(r')} (1 - x_t)$$

where Δ is the symmetric set difference. On the other hand, as $(1-x_t) \in \{0,1\}$, embodiments include that $(1-x_t)^2 = (1-x_t)$, and the lemma follows.

Hence, if $\rho_e^k(x, \lambda)$ is a W-DNF polynomial, by (28) and Lemma 10, so is $\rho_e^{k+1}(x, \lambda)$.

C.2 Proof of Theorem 3

Some embodiments improve by bounding the bias of estimator (19). Indeed, given a set of continuous functions $\{C_{(u,v)}\}_{(u,v) \in E}$ where their first L+1 derivatives within their operating regime, [0,1), are upperbounded by a finite constant, W, the bias of estimator $z \equiv [z_{vi}]_{v \in V, i \in \mathcal{C}}$, where $z_{vi}$ is defined by (21), is given by $$B \equiv \|z - \nabla G(y)\|_2 \quad (29)$$

$$= \left\| \sum_{e \in E} \frac{1}{(L+1)!} C_e^{(L+1)}(\rho_e')(\rho_e - \rho_e^*)^{L+1} \right\|_2,$$

where $\rho_e' \in [\rho_e^*, \rho_e]$. To compute the bias, According to some embodiments, $\rho_e$, $\rho_e^* \in [0,1]$. Specifically, some embodiments assume $\rho_e$, $\rho_e^* \in [0,1)$. Hence, $|\rho_e - \rho_e^*| \leq 1$, and $C_e^{(L+1)}(\rho_e') \leq \max\{C_e^{(L+1)}(\rho_e), C_e^{(L+1)}(\rho_e^*)\} < \infty$. In particular, let $W = \max_{e \in E} C_e^{(L+1)}(\rho_e')$. Then, it is easy to compute the following upper bound on the bias of z:

$$B \leq \frac{W|E|}{(L+1)!}. \quad (30)$$

In addition, note that G is linear in $y_{vi}$, and hence [1]:

$$\frac{\partial G}{\partial y_{vi}} = \mathbb{E}[F(x) | x_{vi} = 1] - \mathbb{E}[F(x) | x_{vi} = 0] = \quad (31)$$

$$\mathbb{E}[C(x) | x_{vi} = 0] - \mathbb{E}[C(x) | x_{vi} = 1] \geq 0,$$

which is ≥0 due to monotonicity of F(x). It is easy to verify that $$\frac{\partial^2 G}{\partial y_{vi}^2} = 0.$$

For $(v_1, i_1) \neq (v_2, i_2)$, embodiments can compute the second derivative of G [1] as given by $$\frac{\partial^2 G}{\partial y_{v_1 i_1} \partial y_{v_2 i_2}} =$$

$$\mathbb{E}[C(x) | x_{v_1 i_1} = 1, x_{v_2 i_2} = 0] + \mathbb{E}[C(x) | x_{v_1 i_1} = 0, x_{v_2 i_2} = 1] -$$
$$\mathbb{E}[C(x) | x_{v_1 i_1} = 1, x_{v_2 i_2} = 1] - \mathbb{E}[C(x) | x_{v_1 i_1} = 0, x_{v_2 i_2} = 0] \leq 0,$$

which is ≤0 due to the supermodularity of C(x). Hence, G(y) is component-wise concave [1].

In additions, it is easy to see that for $y \in \tilde{\mathcal{D}}$, $\|G(y)\|$, $\|\nabla G(y)\|$, and $\|\nabla^2 G(y)\|$ are bounded by $C(x_0)$, $C(x_0)$ and $2C(x_0)$, respectively. Consequently, G and ∇G are P-Lipschitz continuous, with $P=2C(x_0)$.

In the kth iteration of the Continuous Greedy method, let $m^* = m^*(y_k) := (y^* \vee (y_k + y_0)) - y_k = (y^* - y_k) \vee y_0 \geq y_0$, where $x \vee y := (\max\{x_i, y_i\})_i$. Since $m^* \leq y^*$ and $\mathcal{D}$ is closed-down, $m^* \in \mathcal{D}$. Due to monotonicity of G, it follows $$G(y_k + m^*) \geq G(y^*). \tag{32}$$

Some embodiments include univariate auxiliary function $g_{y,m}(\xi) := G(y + \xi m)$, $\xi \in [0,1]$, $m \in \tilde{\mathcal{D}}$. Since G(y) is component-wise concave, then, $g_{y,m}(\xi)$ is concave in $[0,1]$. In addition, since $g_{y_k,m^*}(\xi) = G(y_k + \xi m^*)$ is concave for $\xi \in [0,1]$, it follows $$g_{y_k,m^*}(1) - g_{y_k,m^*}(0) = \tag{33}$$

$$G(y_k + m^*) - G(y_k) \leq \frac{dg_{y_k,m}(0)}{d\xi} \times 1 = \langle m^*, \nabla G(y_k) \rangle.$$

Now let $m_k$ be the vector chosen by Method 2 in the kth iteration. We have $$\langle m_k, z(y_k) \rangle \geq \langle m^*, z(y_k) \rangle. \tag{34}$$

For the LHS, embodiments may include $$\langle m_k, z \rangle = \langle m_k, \nabla G(y_k) \rangle + \langle m_k, z - \nabla G(y_k) \rangle \stackrel{(i)}{\leq} \tag{35}$$
$$\langle m_k, \nabla G(y_k) \rangle + \|m_k\|_2 \cdot \|z - \nabla G(y_k)\|^2 \leq \langle m_k, \nabla G(y_k) \rangle + DB.$$

where $$D = \max_{m \in \tilde{\mathcal{D}}} \|m\|_2 \leq |V| \cdot \max_{v \in V} c_v,$$

is the upperbound on the diameter of $\tilde{\mathcal{D}}$, B is as defined in (30), and (i) follows from Cauchy-Schwarz inequality. Similarly, embodiments may include for the RHS of that (34)

$$\langle m^*, z(y_k) \rangle \geq \langle n^*, \nabla G(y_k) \rangle - DB. \tag{36}$$

It follows $$\langle m_k, \nabla G(y_k) \rangle + 2DB \geq \langle m^*, \nabla G(y_k) \rangle \stackrel{(a)}{\geq} \tag{37}$$
$$G(y_k + m^*) - G(y_k) \stackrel{(b)}{\geq} G(y^*) - G(y_k),$$

where (a) follows from (33), and (b) follows from (32). Using the P-Lipschitz continuity property of $$\frac{dg_{y_k,m_k}(\xi)}{d\xi}$$

(due to P-Lipschitz continuity of ∇G), it is straightforward to see that $$-\frac{P\gamma_k^2}{2} \leq g_{y_k,m_k}(\gamma_k) - g_{y_k,m_k}(0) - \gamma_k \cdot \frac{dg_{y_k,m_k}(0)}{d\xi} = \tag{38}$$
$$G(y_k + \gamma_k m_k) - G(y_k) - \gamma_k < m_k, \nabla G(y_k) >,$$

hence, $$G(y_{k+1}) - G(y_k) \geq \gamma_k \langle m_k, \nabla G(y_k) \rangle - \frac{P\gamma_k^2}{2} \geq \tag{39}$$
$$\gamma_k \langle m_k, \nabla G(y_k) \rangle - \frac{P\gamma_k^2}{2} \stackrel{(c)}{\geq} \gamma_k (G(y^*) - G(y_k)) - 2\gamma_k DB - \frac{P\gamma_k^2}{2},$$

where (c) follows from (37), respectively. By rearranging the terms and letting k=K−1, embodiments may include $+rCl+x^*G(y\_K)-G(y\hat{} *)$ $$G(y_K) - G(y^*) \geq \prod_{j=0}^{K-1}(1-\gamma_j)(G(y_0) - G(y^*)) - 2DB\sum_{j=0}^{K-1}\gamma_j - \frac{P}{2}\sum_{j=0}^{K-1}\gamma_j^2 \stackrel{(c)}{\geq}$$
$$(G(y_0) - G(y^*))\exp\left\{-\sum_{j=0}^{K-1}\gamma_j\right\} - 2DB\sum_{j=0}^{K-1}\gamma_j - \frac{P}{2}\sum_{j=0}^{K-1}\gamma_j^2,$$

where (e) is true since $1-x \leq e^{-x}$, $\forall x \geq 0$, and $G(y_0) \leq G(y^*)$ holds due to the greedy nature of Method 2 and monotonicity of G. In addition, Method 2 ensures $\Sigma_{j=0}^{K-1}\gamma_j = 1$. It follows $$G(y_K) - \left(1 - \frac{1}{e}\right)G(y^*) \geq e^{-1}G(y_0) - 2DB - \frac{P}{2}\sum_{j=0}^{K-1}\gamma_j^2. \tag{40}$$

This result holds for general stepsizes $0 < \gamma_j \leq 1$. The RHS of (40) is maximized when $$\gamma_j = \frac{1}{K},$$

which is the assumed case in Method 2. In addition, embodiments may include $y_0 = 0$, and hence, $G(y_0) = 0$. Therefore, embodiments may include $$G(y_K) - \left(1 - \frac{1}{e}\right)G(y^*) \geq -2DB - \frac{P}{2K}. \quad (41)$$

APPENDIX D

Beyond M/M/1 Queues

D.1 Proof of Lemma 7

For an arbitrary network of M/M/k queues, the traffic load on queue $(u,v) \in E$ is given as $$a_{(u,v)}(x) = \frac{\sum_{r \in R:(v,u) \in p^r} \lambda^r \prod_{k'=1}^{k_p r(v)} \left(1 - x_{p_k^r, r}\right)}{k\mu_{(u,v)}}, \quad (42)$$

which is similar to that of M/M/1 queues, but normalized by the number of servers, k. Hence, $a_{(u,v)}(X)$ is submodular in x. For an M/M/k queue, the probability that an arriving packet finds all servers busy and are forced to wait in queue is given by Erlang C formula [31], which follows $$P_{(u,v)}^Q(x) = \frac{b_{(u,v)}(x)(ka_{(u,v)}(x))^k}{k!(1 - a_{(u,v)}(x))}, \quad (43)$$

where $$b_{(u,v)}(x) = \left[\sum_{n=0}^{k-1} \frac{(ka_{(u,v)}(x))^n}{n!} + \frac{(ka_{(u,v)}(x))^k}{k!(1 - a_{(u,v)}(x))}\right]^{-1}, \quad (44)$$

is the normalizing factor. In addition, the expected number of packets waiting for or under transmission is given by $$\mathbb{E}[n_{(u,v)}(x)] = ka_{(u,v)}(x) + \frac{a_{(u,v)}(x) P_{(u,v)}^Q(x)}{1 - a_{(u,v)}(x)}. \quad (45)$$

Lee and Cohen [34] show that $P_{(u,v)}^Q(x)$ and $\mathbb{E}[n_{(u,v)}(x)]$ are strictly increasing and convex in $a_{(u,v)}(x)$, for $a_{(u,v)}(x) \in [0,1)$. In addition, a more direct proof of convexity of $\mathbb{E}[n_{(u,v)}(x)]$ was shown by Grassmann in [35]. Hence, both $P(x) := \sum_{(u,v) \in E} P_{(u,v)}^Q(x)$ and $N(x) := \sum_{(u,v) \in E} \mathbb{E}[n_{(u,v)}(x)]$ are increasing and convex. Due to Theorem 1, According to some embodiments, both functions are non-increasing and supermodular in x, and the proof is complete.

D.2 Proof of Lemma 8

Let $\rho_{(u,v)}(x)$ be the traffic load on queue $(u, v) \in E$, as defined by (3). It can be shown that the average number of packets in queue $(u, v) \in E$ is of form [31]

$$\mathbb{E}[n_{(u,v)}(x)] = \rho_{(u,v)}(x) + \frac{\rho_{(u,v)}^2(x)}{2(1 - \rho_{(u,v)}(x))}. \quad (46)$$

It is easy to see that this function is strictly increasing and convex in $\rho_{(u,v)}(x)$ for $\rho_{(u,v)}(x) \in [0,1)$. Due to Theorem 1, $N(x) := \sum_{(u,v) \in E} \mathbb{E}[n_{(u,v)}(x)]$ is non-increasing and supermodular in x, and the proof is complete.

D.3 Proof of Lemma 9

TABLE 3

Results of $\rho_{u,v}(x)$'s for different caching configurations.

| $[x_{11}, x_{21}]$ | $\rho_{3,2}$ | $\rho_{2,1}$ |
|---|---|---|
| [0, 0] | $\dfrac{\lambda}{\mu_{3,2}}$ | $\dfrac{\lambda(1 - p_{3,2}^L)}{\mu_{2,1}}$ |
| [1, 0] | 0 | 0 |
| [0, 1] | 0 | $\dfrac{\lambda}{\mu_{2,1}}$ |
| [1, 1] | 0 | 0 |

Figure 9:
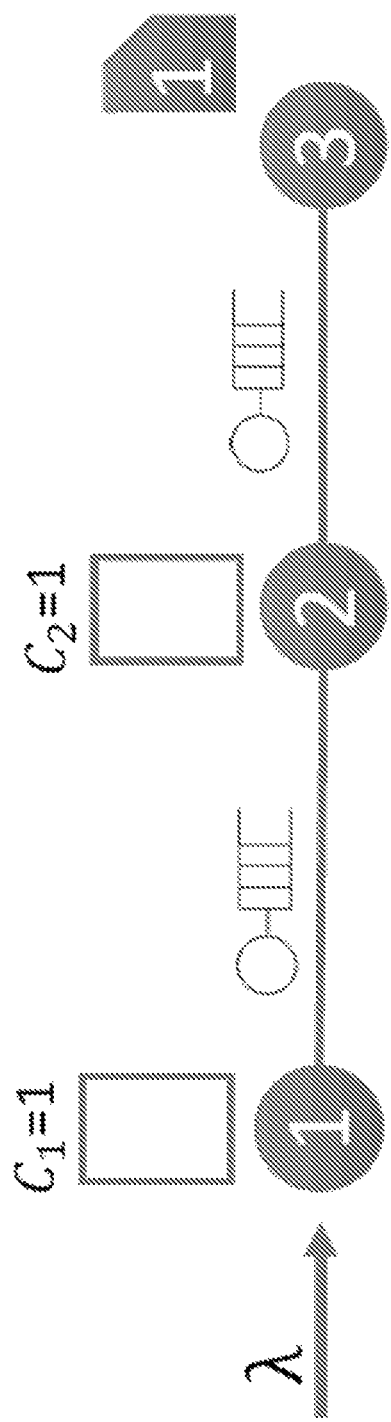
FIG. 9 illustrates a further network topology in which some embodiments may be configured to operate.

Consider the network of M/M/1/k queues in FIG. 9, where node 1 is requesting content 1 from node 3, according to a Poisson process with rate $\lambda$. For simplicity, some embodiments may consider the traffic for content 1. For queues (2,1) and (3,2), it is easy to verify that the probability of packet drop at queues $(u, v) \in \{(2,1), (3,2)\}$ is given by $$p_{(u,v)}^L(\rho_{(u,v)}) = \frac{\rho_{(u,v)}(x)^k(1 - \rho_{(u,v)}(x))}{1 - \rho_{(u,v)}(x)^{k+1}}, \quad (47)$$

where $\rho_{(u,v)}(x)$ is the traffic load on queue $(u, v)$, and it may be computed for (2,1) and (3,2) as follows:

$$\rho_{(2,1)}(x_{11}, x_{21}) = \frac{\lambda(1 - x_{11})(1 - p_{(3,2)}^L)}{\mu_{(2,1)}}, \quad (48)$$

$$\rho_{(3,2)}(x_{11}, x_{21}) = \frac{\lambda(1 - x_{11})(1 - x_{21})}{\mu_{(3,2)}}. \quad (49)$$

Using the results reported in Table 3, it is easy to verify that $\rho$'s is not monotone in x. Hence, no strictly monotone function of $\rho$'s is monotone in x. In addition, it may be verified that $\rho$'s is neither submodular, nor supermodular in x. To show this, let sets $A = \emptyset$, and $B = \{(1,1)\}$, correspond to caching configurations [0,0] and [1,0], respectively. Note that $A \subset B$, and $(2,1) \notin B$. Since $$\rho_{(3,2)}(A \cup \{(2, 1)\}) - \rho_{(3,2)}(A) = -\frac{\lambda}{\mu_{(3,2)}} \neq 0 = \rho_{(3,2)}(B \cup \{(2, 1)\}) - \rho_{(3,2)}(B),$$

then $\rho_{(3,2)}$ may not be submodular. Consequently, no strictly monotone function of $\rho_{(3,2)}$ is submodular. Similarly, as $$\rho_{(2,1)}(A \cup \{(2, 1)\}) - \rho_{(2,1)}(A) \frac{\lambda p_{(3,2)}^L}{\mu_{(2,1)}} \neq 0 =$$

$$\rho_{(2,1)}(B \cup \{(2, 1)\}) - \rho_{(2,1)}(B), \rho_{(2,1)}$$

may not be supermodular. Thus, no strictly monotone function of $\rho_{(2,1)}$ is supermodular.

REFERENCES

[1] Gruia Calinescu, Chandra Chekuri, Martin Pál, and Jan Vondrák. Maximizing a monotone submodular function subject to a matroid constraint. *SIAM Journal on Computing*, 40(6):1740-1766, 2011.

[2] Frank P Kelly. *Reversibility and stochastic networks*. Cambridge University Press, 2011.

[3] Robert G Gallager. *Stochastic processes: theory for applications*. Cambridge University Press, 2013.

[4] Randolph Nelson. *Probability, Stochastic Processes, and Queueing Theory: The Mathematics of Computer Performance Modeling*. Springer Publishing Company, Incorporated, 1st edition, 2010.

[5] Hong Chen and David D Yao. *Fundamentals of queueing networks: Performance, asymptotics, and optimization*, volume 46. Springer Science & Business Media, 2013.

[6] Van Jacobson, Diana K Smetters, James D Thornton, Michael F Plass, Nicholas H Briggs, and Rebecca L Braynard. Networking named content. In *CoNEXT*, 2009.

[7] Edmund Yeh, Tracey Ho, Ying Cui, Michael Burd, Ran Liu, and Derek Leong. VIP: A framework for joint dynamic forwarding and caching in named data networks. In *ICN*, 2014.

[8] Stratis Ioannidis and Edmund Yeh. Adaptive caching networks with optimality guarantees. In *SIGMETRICS*, 2016.

[9] Sem Borst, Varun Gupta, and Anwar Walid. Distributed caching methods for content distribution networks. In *INFOCOM*, 2010.

[10] Mostafa Dehghan, Anand Seetharam, Bo Jiang, Ting He, Theodoros Salonidis, Jim Kurose, Don Towsley, and Ramesh Sitaraman. On the complexity of optimal routing and content caching in heterogeneous networks. In *INFOCOM*, 2014.

[11] Nikolaos Laoutaris, Sofia Syntila, and Ioannis Stavrakakis. Meta methods for hierarchical web caches. In *ICPCC*, 2004.

[12] Hao Che, Ye Tung, and Zhijun Wang. Hierarchical web caching systems: Modeling, design and experimental results. *Selected Areas in Communications*, 20(7):1305-1314, 2002.

[13] Yuanyuan Zhou, Zhifeng Chen, and Kai Li. Second-level buffer cache management. *Parallel and Distributed Systems*, 15(6):505-519, 2004.

[14] Karthikeyan Shanmugam, Negin Golrezaei, Alexandros G Dimakis, Andreas F Molisch, and Giuseppe Caire. Femtocaching: Wireless content delivery through distributed caching helpers. *Transactions on Information Theory*, 59(12):8402-8413, 2013.

[15] K P Naveen, Laurent Massoulié, Emmanuel Baccelli, Aline Carneiro Viana, and Don Towsley. On the interaction between content caching and request assignment in cellular cache networks. In *ATC*, 2015.

[16] Konstantinos Poularakis, George Iosifidis, and Leandros Tassiulas. Approximation caching and routing methods for massive mobile data delivery. In *GLOBECOM*, 2013.

[17] Qin L v, Pei Cao, Edith Cohen, Kai Li, and Scott Shenker. Search and replication in unstructured peer-to-peer networks. In *ICS*, 2002.

[18] Edith Cohen and Scott Shenker. Replication strategies in unstructured peer-to-peer networks. In *SIGCOMM*, 2002.

[19] Karthikeyan Shanmugam, Negin Golrezaei, Alexandros G Dimakis, Andreas F Molisch, and Giuseppe Caire. Femtocaching: Wireless content delivery through distributed caching helpers. *IEEE Transactions on Information Theory*, 2013.

[20] Alexander A Ageev and Maxim I Sviridenko. Pipage rounding: A new method of constructing methods with proven performance guarantee. *Journal of Combinatorial Optimization*, 8(3):307-328, 2004.

[21] Stratis Ioannidis and Edmund Yeh. Jointly optimal routing and caching for arbitrary network topologies. In *ICN*, 2017.

[22] Ivan Baev, Rajmohan Raj araman, and Chaitanya Swamy. Approximation methods for data placement problems. *SIAM Journal on Computing*, 38(4):1411-1429, 2008.

[23] Yair Bartal, Amos Fiat, and Yuval Rabani. Competitive methods for distributed data management. *Journal of Computer and System Sciences*, 51(3):341-358, 1995.

[24] Lisa Fleischer, Michel X Goemans, Vahab S Mirrokni, and Maxim Sviridenko. Tight approximation methods for maximum general assignment problems. In *SODA*, 2006.

[25] David Applegate, Aaron Archer, Vijay Gopalakrishnan, Seungjoon Lee, and Kadangode K Ramakrishnan. Optimal content placement for a large-scale VoD system. In *CoNEXT*, 2010.

[26] Andreas Krause and Daniel Golovin. Submodular function maximization. *Tractability: Practical Approaches to Hard Problems*, 2012.

[27] Pranava R Goundan and Andreas S Schulz. Revisiting the greedy approach to submodular set function maximization. *Optimization Online*, 2007.

[28] G. L. Nemhauser, L. A. Wolsey, and M. L. Fisher. An analysis of approximations for maximizing submodular set functions—i. *Mathematical Programming*, 14(1):265-294, December 1978.

[29] Jan Vondrák. Optimal approximation for the submodular welfare problem in the value oracle model. In *STOC*, 2008.

[30] George L Nemhauser and Laurence A Wolsey. Best methods for approximating the maximum of a submodular set function. *Mathematics of operations research*, 3(3):177-188, 1978.

[31] Dimitri P Bertsekas, Robert G Gallager, and Pierre Humblet. *Data networks*, volume 2. Prentice-Hall International New Jersey, 1992.

[32] Gruia Calinescu, Ra Chekuri, Martin PÃ¡l, and Jan VondrÃ¡k. Maximizing a submodular set function subject to a matroid constraint. In *IPCO*, 2007.

[33] Chandra Chekuri, Jan Vondrak, and Rico Zenklusen. Dependent randomized rounding via exchange properties of combinatorial structures. In *FOCS*, 2010.

[34] Hau Leung Lee and Morris A. Cohen. A note on the convexity of performance measures of m/m/c queueing systems. *Journal of Applied Probability*, 20(4):920?923, 1983.

[35] W. Grassmann. The convexity of the mean queue size of the m/m/c queue with respect to the traffic intensity. *Journal of Applied Probability*, 20(4):916?919, 1983.

Figure 10:
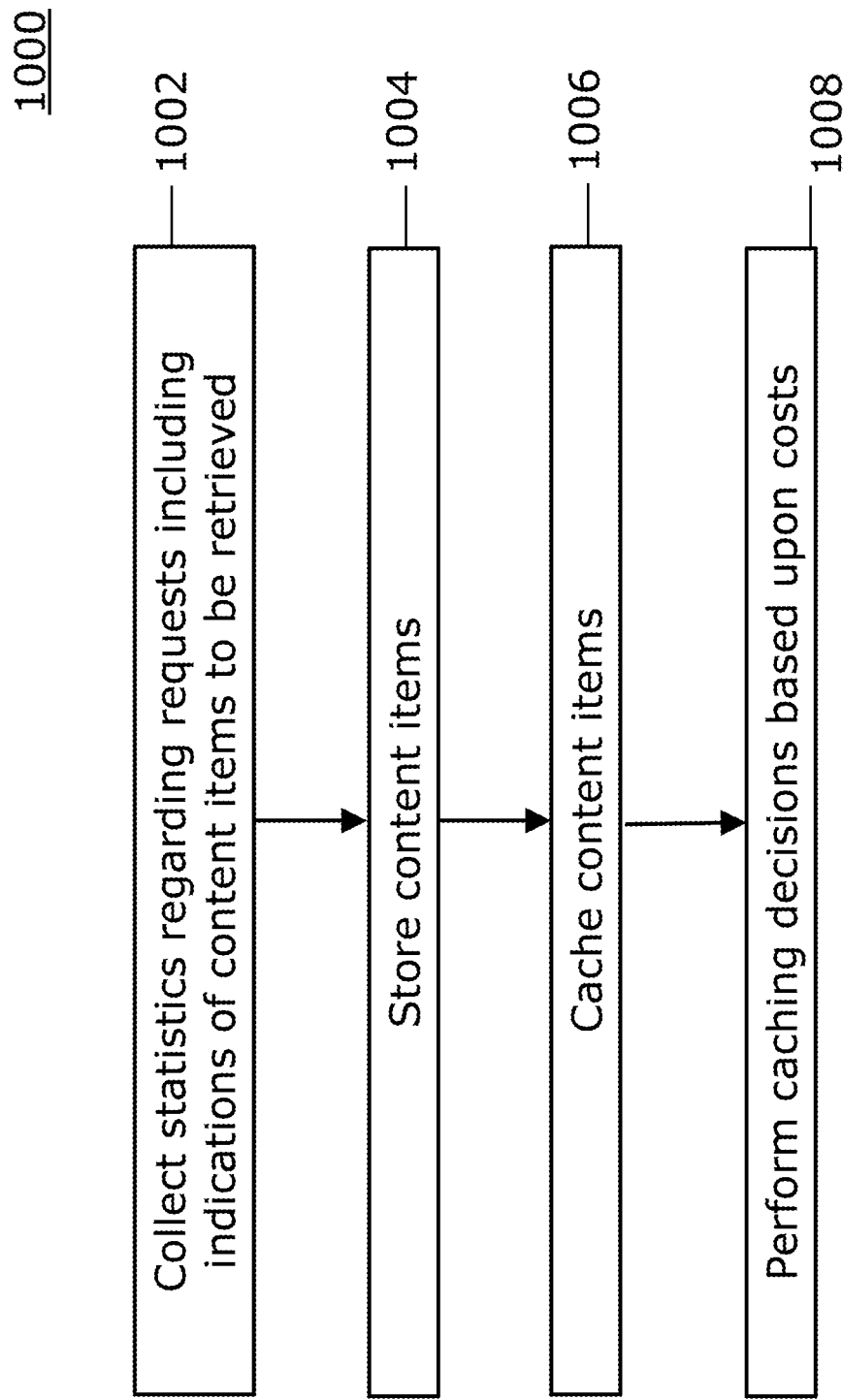
FIG. 10 is a flow diagram illustrating an example embodiment of a method of the present disclosure.

Method, Network, and System:

FIG. 10 is a flow diagram illustrating an example embodiment of a method 1000 of the present disclosure. In some embodiments, a network includes nodes communicatively coupled to neighboring nodes via respective links in the network for distributing cached content.

As illustrated in FIG. 10, in some embodiments, the method 1000 may collect statistics regarding requests made and paths taken by the requests from source nodes to server nodes via intermediate nodes, the source nodes, intermediate nodes, and server nodes interconnected by edges having queues with respective queue sizes associated therewith (1002). The requests may include indications of content items to be retrieved. The method may store the content items at the server nodes (1004). Via intermediate nodes, the method may cache the content items up to a caching capacity (1006). The method may perform caching decisions that determine which of the content items are to be cached at which of the intermediate nodes, based upon costs that are monotonic, non-decreasing functions of the sizes of the queues (1008).

In some embodiments, the method may be further configured to perform the caching decisions further based on a greedy computer-implemented method. In some embodiments, the costs may be associated with one or more of the edges. In some embodiments, the method may determine the costs based upon a Taylor approximation. In some embodiments, the costs may be expected costs.

In some embodiments, the method may perform the caching decisions further based on marginal gain. In some embodiments, the marginal gain may be associated with the costs with respect to the determination of which of the content items are to be cached.

Figure 11:
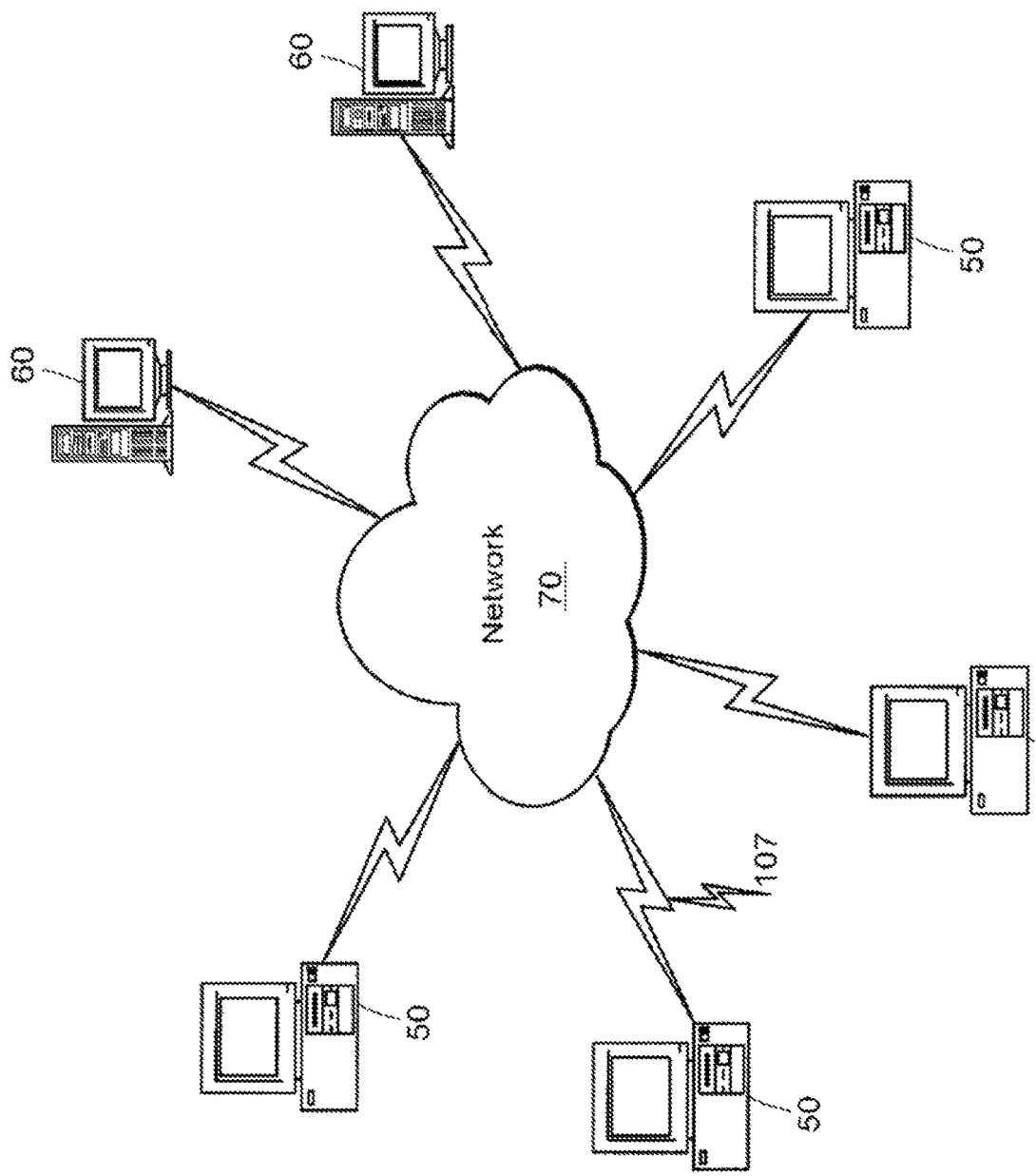
FIG. 11 is a network diagram that illustrates a computer network or similar digital processing environment in which embodiments of the present disclosure may be implemented.

FIG. 11 is a network diagram that illustrates a computer network or similar digital processing environment 1100 in which embodiments of the present disclosure may be implemented. Client computer(s)/devices 50 (e.g., computing devices/display devices) and server computer(s) 60 (e.g., a Cloud-based service) provide processing, storage, and input/output devices executing application programs and the like. The client computer(s)/devices 50 (e.g., computing devices/display devices) can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, BLUETOOTH™, etc.) to communicate with one another. Other electronic device/computer network architectures are suitable. According to some embodiments, caching and forwarding may be performed in distributed locations (i.e., at each network node).

Figure 12:
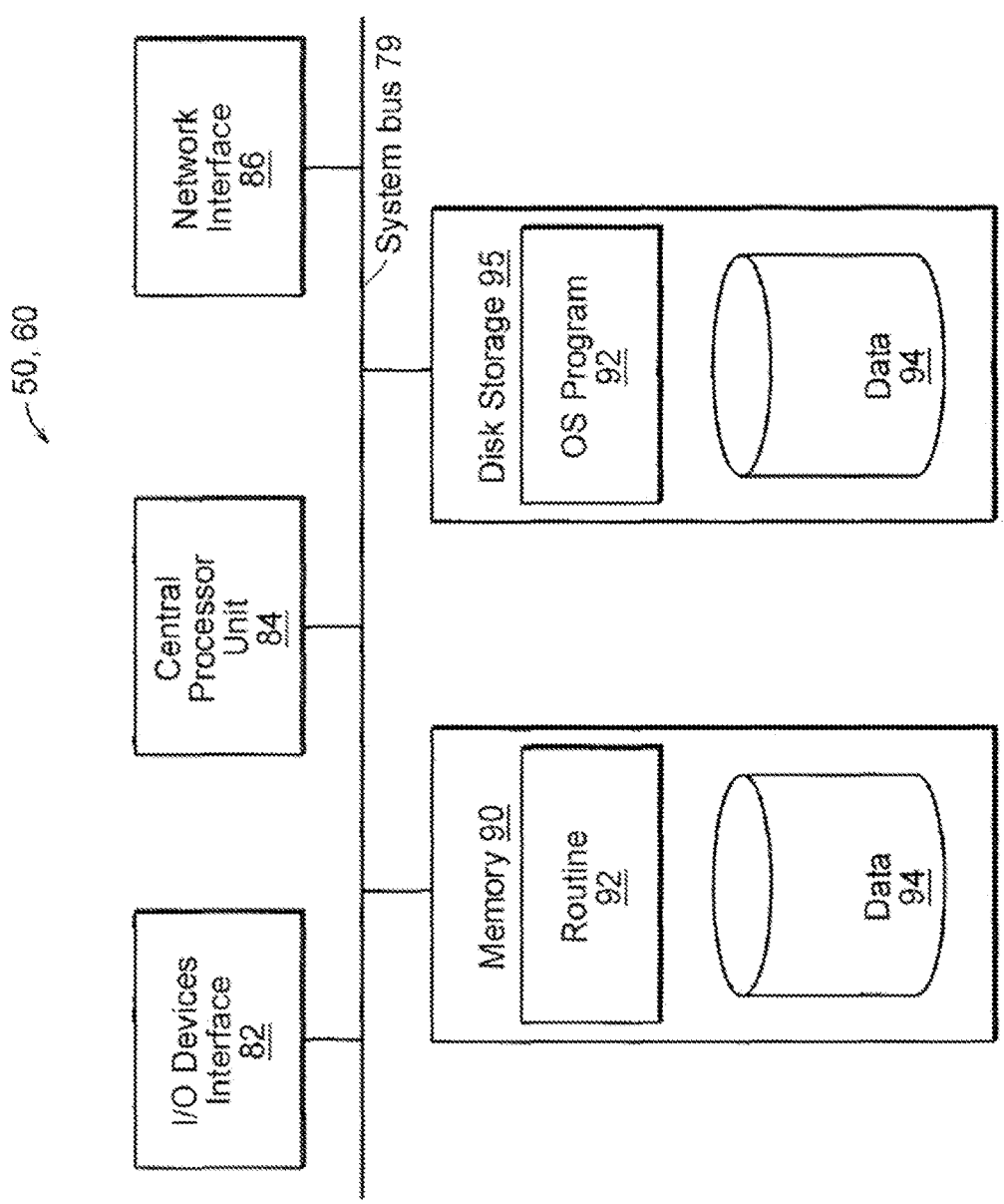
FIG. 12 is a block diagram of an example internal structure of a computer (e.g., client processor/device or server computers) in the computer system or apparatus of FIG. 11, according to some embodiments.

FIG. 12 is a block diagram of an example internal structure of a computer (e.g., client processor/device 50 or server computers 60) 1200 in the computer system or apparatus of FIG. 11. Each computer 50, 60 includes a system bus 79, where a bus is a set of hardware lines used for data transfer among the components (e.g., entities) of a computer or processing system or apparatus. The system bus 79 is essentially a shared conduit that connects different elements of a computer system or apparatus (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, touchscreen etc.) to the computer 50, 60. A network interface 86 allows the computer to connect to various other devices attached to a network (e.g., network 70 of FIG. 11). Memory 90 provides volatile storage for computer software instructions 92 and data 94 used to implement embodiments of the present disclosure (e.g., including but not limited to including any of the processor, memory, network node, network, network manager, or any other device, engine, system, module, or controller described herein). Disk storage 95 provides non-volatile storage for computer software instructions 92 and data 94 used to implement some embodiments of the present disclosure. Note, data 94 may be the same between a client 50 and server 60, however, the type of computer software instructions 92 may differ between a client 50 and a server 60. A central processor unit 84 is also attached to the system bus 79 and provides for the execution of computer instructions.

As illustrated in FIG. 12, in an embodiment, the system or apparatus 800 includes a processor 84 and a memory 90 with computer code instructions stored therein. The memory 90 is operatively coupled to the processor 84 such that the computer code instructions configure the processor 84 to implement content delivery.

In some embodiments, the network of FIG. 11 includes network nodes 50. The network nodes 50 may include source nodes, server nodes associated with one or more servers, or intermediate nodes. The source nodes, intermediate nodes, and server nodes may be interconnected by edges having queues with respective queue sizes associated therewith. The network of FIG. 11 may be configured to collect statistics regarding requests made and paths taken by the requests from source nodes 50 to server nodes 60 via intermediate nodes.

The requests may include indications of content items to be retrieved. The content items may be stored at the server nodes 60. The intermediate nodes may be configurable to cache the content items up to a caching capacity. The network (which may be at least partially implemented as processor unit 84 of FIG. 12) may be configured to perform caching decisions that determine which of the content items are to be cached at which of the intermediate nodes, based upon costs that are monotonic, non-decreasing functions of the sizes of the queues.

Referring back to FIG. 12, in some embodiments, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the disclosure system. Computer program product 92 may be installed by any suitable software installation procedure, as is well known in the art. In another embodiment, at least a portion of the software instructions may also be downloaded over a cable, communication or wireless connection. In other embodiments, the disclosure programs are a computer program propagated signal product 107 (shown in FIG. 11) embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present disclosure routines/program 92.

Embodiments or aspects thereof may be implemented in the form of hardware (including but not limited to hardware circuitry), firmware, or software. If implemented in software, the software may be stored on any non-transitory computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, or some combination thereof, and, thus, the data processors described herein are intended for purposes of illustration only and not as a limitation of the embodiments.

While this disclosure has been particularly shown and described with references to example embodiments thereof, it is understood by those skilled in the art that various changes in form and details may be made therein without departing from the scope of the disclosure encompassed by the appended claims.

Embodiments solve a technical problem, thereby providing a technical effect, or provide technical advantages or functional improvements including making caching decisions to reduce traffic dependent costs at network queues. Some embodiments have provable optimality guarantees, attaining a cost reduction within a factor of approximately 0.67 from the optimal cost reduction attained by existing methods. Embodiments avoid randomization and sampling, attaining provable guarantees at a reduced computational complexity. Embodiments approximate arbitrary convex cost functions via power and Taylor series approximations, leading to a fast and efficient implementation avoiding randomization and sampling. Embodiments significantly outperforms existing approaches in both caching decisions and computational complexity.

Yet further, embodiments provide technical advantages or functional improvements in that such embodiments can directly find application in a system where content is to be placed in a network with varying demand including but not limited to (i) Content delivery networks, (ii) Information centric networks, (iii) Peer-to-peer networks, and (iv) Cloud computing.

While example embodiments are particularly shown and described, it is understood by those skilled in the art that various changes in form and details may be made therein without departing from the scope of the embodiments encompassed by the appended claims.

What is claimed is:

1. A network manager configured to:
   collect statistics regarding requests made and paths taken by the requests from source nodes to server nodes via intermediate nodes, the source nodes, intermediate nodes, and server nodes interconnected by edges having queues with respective queue sizes associated therewith, the requests including indications of content items to be retrieved, the content items being stored at the server nodes, the intermediate nodes configurable to cache the content items up to a caching capacity; and
   perform caching decisions that determine which of the content items are to be cached at which of the intermediate nodes, based upon costs that are monotonic, non-decreasing functions of the sizes of the queues.

2. The network manager of claim 1, wherein the network manager is further configured to perform the caching decisions further based on a greedy computer-implemented method.

3. The network manager of claim 1, wherein the network manager is further configured to perform the caching decisions further based on a continuous greedy computer-implemented method.

4. The network manager of claim 1, wherein the costs are associated with one or more of the edges.

5. The network manager of claim 1, wherein the costs are determined based upon a Taylor approximation.

6. The network manager of claim 1, wherein the costs are expected costs.

7. The network manager of claim 1, wherein the network manager is further configured to perform the caching decisions further based on marginal gain.

8. The network manager of claim 7, wherein the marginal gain is associated with the costs with respect to the determination of which of the content items are to be cached.

9. A computer-implemented method for distributing cached content in a network, the computer-implemented method comprising:
   collecting statistics regarding requests made and paths taken by the requests from source nodes to server nodes via intermediate nodes, the source nodes, intermediate nodes, and server nodes interconnected by edges having queues with respective queue sizes associated therewith, the requests including indications of content items to be retrieved;
   storing the content items at the server nodes;
   caching, by the intermediate nodes, the content items up to a caching capacity; and
   performing caching decisions that determine which of the content items are to be cached at which of the intermediate nodes, based upon costs that are monotonic, non-decreasing functions of the sizes of the queues.

10. The computer-implemented method of claim 9, further comprising further performing the caching decisions further based on a greedy computer-implemented method.

11. The computer-implemented method of claim 9, further comprising further performing the caching decisions further based on a continuous greedy computer-implemented method.

12. The computer-implemented method of claim 9, wherein the costs are associated with one or more of the edges.

13. The computer-implemented method of claim 9, wherein the costs are determined based upon a Taylor approximation.

14. The computer-implemented method of claim 9, wherein the costs are expected costs.

15. The computer-implemented method of claim 9, further comprising further performing the caching decisions further based on marginal gain.

16. The computer-implemented method of claim 15, wherein the marginal gain is associated with the costs with respect to the determination of which of the content items are to be cached.

17. A network node, the network node comprising:
   a network interface; and
   a processor configured to collect statistics regarding requests made and paths taken by the requests from source nodes to server nodes via intermediate nodes, the source nodes, intermediate nodes, and server nodes interconnected by edges having queues with respective queue sizes associated therewith, the requests including indications of content items to be retrieved, the content items being stored at the server nodes, the intermediate nodes configurable to cache the content items up to a caching capacity, and perform caching decisions that determine which of the content items are to be cached at which of the intermediate nodes, based upon costs that are monotonic, non-decreasing functions of the sizes of the queues.

18. The network node of claim 17, wherein the processor is further configured to perform the caching decisions further based on a greedy computer-implemented method.

19. The network node of claim 17, wherein the processor is further configured to perform the caching decisions further based on a continuous greedy computer-implemented method.

20. A computer program product including a non-transitory computer-readable medium having processor-executable instructions stored thereon, the instructions, when loaded and executed by a processor, cause a node in a network, the node communicatively coupled to neighboring nodes in the network via respective links, to:
   collect statistics regarding requests made and paths taken by the requests from source nodes to server nodes via intermediate nodes, the source nodes, intermediate nodes, and server nodes interconnected by edges having queues with respective queue sizes associated therewith, the requests including indications of content items to be retrieved, the content items being stored at the server nodes, the intermediate nodes configurable to cache the content items up to a caching capacity; and
   perform caching decisions that determine which of the content items are to be cached at which of the intermediate nodes, based upon costs that are monotonic, non-decreasing functions of the sizes of the queues.

* * * * *